(12) United States Patent
Stefanski et al.

(10) Patent No.: US 8,544,285 B2
(45) Date of Patent: Oct. 1, 2013

(54) HVAC CONTROLLER WITH USER-FRIENDLY INSTALLATION FEATURES FACILITATING BOTH DO-IT-YOURSELF AND PROFESSIONAL INSTALLATION SCENARIOS

(71) Applicant: Nest Labs, Inc., Palo Alto, CA (US)

(72) Inventors: Mark D. Stefanski, Palo Alto, CA (US); David Sloo, Menlo Park, CA (US); Yoky Matsuoka, Palo Alto, CA (US)

(73) Assignee: Nest Labs, Inc., Palo Alto, CA (US)

( * ) Notice: Subject to any disclaimer, the term of this patent is extended or adjusted under 35 U.S.C. 154(b) by 0 days.

(21) Appl. No.: 13/632,148

(22) Filed: Sep. 30, 2012

(65) Prior Publication Data

US 2013/0087629 A1     Apr. 11, 2013

Related U.S. Application Data

(63) Continuation-in-part of application No. 13/269,501, filed on Oct. 7, 2011.

(60) Provisional application No. 61/627,996, filed on Oct. 21, 2011.

(51) Int. Cl.
*F25B 1/00* (2006.01)

(52) U.S. Cl.
USPC .......................................... 62/115; 236/91 D

(58) Field of Classification Search
USPC ......... 62/129, 132, 156, 157, 231; 236/91 R, 236/91 D, 91 F
See application file for complete search history.

(56) References Cited

U.S. PATENT DOCUMENTS

| | | | |
|---|---|---|---|
| 4,948,040 | A | 8/1990 | Kobayashi et al. |
| 5,065,813 | A | 11/1991 | Berkeley et al. |
| 5,161,606 | A | 11/1992 | Berkeley et al. |
| 5,452,762 | A | 9/1995 | Zillner, Jr. |

(Continued)

FOREIGN PATENT DOCUMENTS

| EP | 447458 A1 | 9/1991 |
|---|---|---|
| EP | 510807 A2 | 10/1992 |

(Continued)

OTHER PUBLICATIONS

Aprilaire Electronic Thermostats Model 8355 User's Manual, Research Products Corporation, 2000; 16 pages.

(Continued)

*Primary Examiner* — Mohammad M Ali
(74) *Attorney, Agent, or Firm* — Kilpatrick Townsend & Stockton LLP

(57) ABSTRACT

A thermostat includes a housing, a user interface, and a processing system configured to control an HVAC system using setpoint temperature values. The thermostat may also include a plurality of HVAC connectors configured to receive corresponding HVAC control wires, and a connection sensing module configured to determine the identities of HVAC connectors into which corresponding wires have been inserted. The processing system may be further configured to identify, based on the subset of HVAC connectors, whether (i) only a single possible HVAC system configuration is indicated thereby, or (ii) multiple possible HVAC system configurations are indicated thereby, resolve a particular one of the multiple possible HVAC system configurations that is applicable based on a user response to an inquiry presented on the user interface, and operate the HVAC system according to the HVAC system configuration.

20 Claims, 19 Drawing Sheets

(56) References Cited

U.S. PATENT DOCUMENTS

| | | | |
|---|---|---|---|
| 5,467,921 A | 11/1995 | Shreeve et al. | |
| 5,931,378 A * | 8/1999 | Schramm | 236/94 |
| 5,950,709 A | 9/1999 | Krueger et al. | |
| 6,102,749 A | 8/2000 | Lynn et al. | |
| 6,295,823 B1 * | 10/2001 | Odom et al. | 62/176.6 |
| 6,560,977 B1 * | 5/2003 | Hupfel et al. | 62/129 |
| 6,804,117 B2 * | 10/2004 | Phillips et al. | 361/700 |
| 6,826,454 B2 * | 11/2004 | Sulfstede | 700/276 |
| 6,851,621 B1 | 2/2005 | Wacker et al. | |
| 6,888,441 B2 * | 5/2005 | Carey | 337/380 |
| 6,933,655 B2 * | 8/2005 | Morrison et al. | 310/314 |
| 6,997,390 B2 | 2/2006 | Alles | |
| 7,055,759 B2 | 6/2006 | Wacker et al. | |
| 7,083,109 B2 | 8/2006 | Pouchak | |
| 7,156,318 B1 | 1/2007 | Rosen | |
| 7,167,079 B2 | 1/2007 | Smyth et al. | |
| 7,181,317 B2 | 2/2007 | Amundson et al. | |
| 7,209,870 B2 * | 4/2007 | Simmons et al. | 703/1 |
| 7,331,852 B2 * | 2/2008 | Ezell et al. | 454/229 |
| 7,360,370 B2 | 4/2008 | Shah et al. | |
| 7,555,364 B2 | 6/2009 | Poth et al. | |
| 7,562,536 B2 | 7/2009 | Harrod et al. | |
| 7,566,263 B2 * | 7/2009 | Snyder | 454/332 |
| 7,634,504 B2 | 12/2009 | Amundson | |
| 7,748,640 B2 | 7/2010 | Roher et al. | |
| 7,821,218 B2 * | 10/2010 | Butler et al. | 318/461 |
| 7,844,764 B2 | 11/2010 | Williams | |
| 7,847,681 B2 | 12/2010 | Singhal et al. | |
| 8,067,912 B2 | 11/2011 | Mullin | |
| 2004/0130454 A1 | 7/2004 | Barton | |
| 2004/0193324 A1 | 9/2004 | Hoog et al. | |
| 2004/0238651 A1 | 12/2004 | Juntunen et al. | |
| 2005/0040250 A1 | 2/2005 | Wruck | |
| 2005/0159846 A1 | 7/2005 | Van Ostrand et al. | |
| 2007/0045441 A1 | 3/2007 | Ashworth et al. | |
| 2007/0208461 A1 | 9/2007 | Chase | |
| 2007/0221741 A1 | 9/2007 | Wagner et al. | |
| 2007/0228183 A1 | 10/2007 | Kennedy et al. | |
| 2008/0048046 A1 * | 2/2008 | Wagner et al. | 236/91 R |
| 2008/0128523 A1 | 6/2008 | Hoglund et al. | |
| 2008/0161977 A1 | 7/2008 | Takach et al. | |
| 2009/0057425 A1 | 3/2009 | Sullivan et al. | |
| 2009/0140056 A1 | 6/2009 | Leen | |
| 2009/0140064 A1 | 6/2009 | Schultz et al. | |
| 2009/0140065 A1 | 6/2009 | Juntunen et al. | |
| 2009/0143879 A1 | 6/2009 | Amundson et al. | |
| 2009/0143880 A1 | 6/2009 | Amundson et al. | |
| 2010/0070089 A1 * | 3/2010 | Harrod et al. | 700/277 |
| 2010/0114382 A1 | 5/2010 | Ha et al. | |
| 2010/0131112 A1 | 5/2010 | Amundson et al. | |
| 2010/0163635 A1 | 7/2010 | Ye | |
| 2010/0298985 A1 | 11/2010 | Hess et al. | |

FOREIGN PATENT DOCUMENTS

| | | | |
|---|---|---|---|
| SI | 20556 A | 10/2001 | |
| WO | 2005019740 A1 | 3/2005 | |
| WO | 2007027554 A2 | 3/2007 | |

OTHER PUBLICATIONS

Braeburn 5300 Installer Guide, Braeburn Systems, LLC, 2009; 10 pages.
Braeburn Model 5200, Braeburn Systems, LLC, 2011; 11 pages.
Ecobee Smart Thermostat Installation Manual, 2011; 20 pages.
Ecobee Smart Thermostat User Manual, 2010; 20 pages.
Honeywell Installation Guide FocusPRO TH6000 Series, Honeywell International, Inc., 2012; 24 pages.
Honeywell Operating Manual FocusPRO TH6000 Series, Honeywell International, Inc., 2011; 80 pages.
Honeywell Prestige IAQ Product Data, Honeywell International, Inc., 2012; 126 pages.
Honeywell Prestige THX9321-9421 Operating Manual, Honeywell International, Inc., 2011; 120 pages.
Hunter Internet Thermostat Installation Guide, Hunter Fan Co., 2012; 8 pages.
Installation and Start—Up Instructions Evolution Control, Bryant Heating & Cooling Systems, 2004; 12 pages.
Lennox ComfortSense 5000 Owners Guide, Lennox Industries, Inc., 2007; 32 pages.
Lennox ComfortSense 7000 Owners Guide, Lennox Industries, Inc., 2009; 15 pages.
Lennox iComfort Manual, Lennox Industries, Inc., 2010; 20 pages.
Lux PSPU732T Manual, LUX Products Corporation; 48 pages.
RobertShaw Product Manual 9620, Maple Chase Company, 2001; 14 pages.
RobertShaw Product Manual 9825i2, Maple Chase Company, 2006; 36 pages.
SYSTXCCUIZ01-V Infinity Control Installation Instructions, Carrier Corp, 2012; 20 pages.
TB-PAC, TB-PHP, Base Series Programmable Thermostats, Carrier Corp, 2012; 8 pages.
Trane Communicating Thermostats for Fan Coil, Trane, 2011; 32 pages.
Trane Communicating Thermostats for Heat Pump Control, Trane, 2011; 32 pages.
Trane Install XL600-Installation-Manual, Trane, 2006; 16 pages.
Trane XL950 Installation Guide, Trane, 2011; 20 pages.
Venstar T2900Manual, Venstar, Inc., 2008; 113 pages.
Venstar T5800Manual, Venstar, Inc.; 63 pages.
VisionPRO TH8000 Series Installation Guide, Honeywell International, Inc., 2012; 12 pages.
VisionPRO TH8000 Series Operating Manual, Honeywell International, Inc., 2012; 96 pages.
VisionPRO Wi-Fi Programmable Thermostat, Honeywell International, Inc, 2012; 48 pages.
White Rodgers (Emerson) Model 1F81-261 Installation and Operating Instructions, White Rodgers; 8 pages.
White Rodgers (Emerson) Model IF98EZ-1621 Homeowner's User Guide, White Rodgers; 28 pages.

* cited by examiner

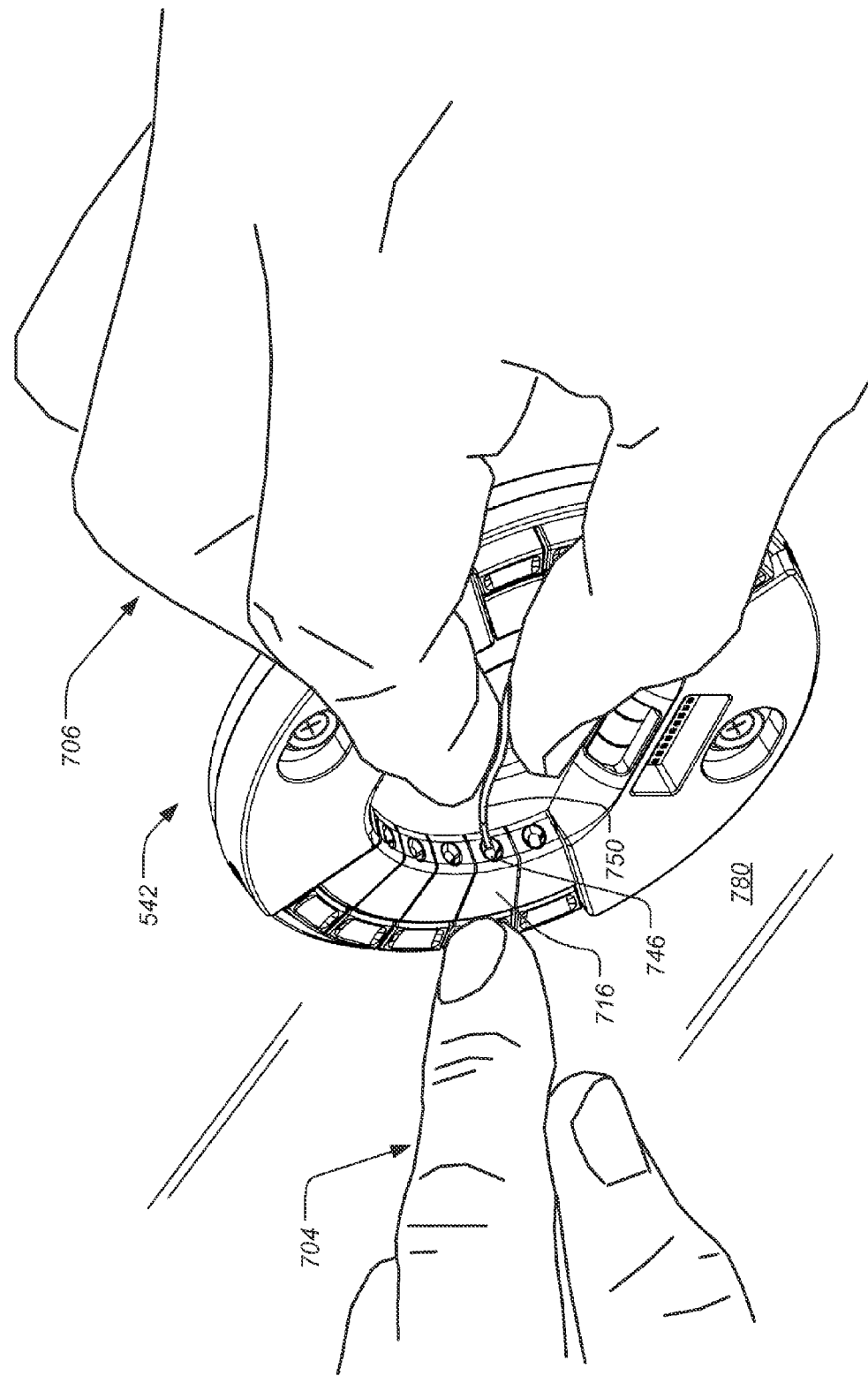

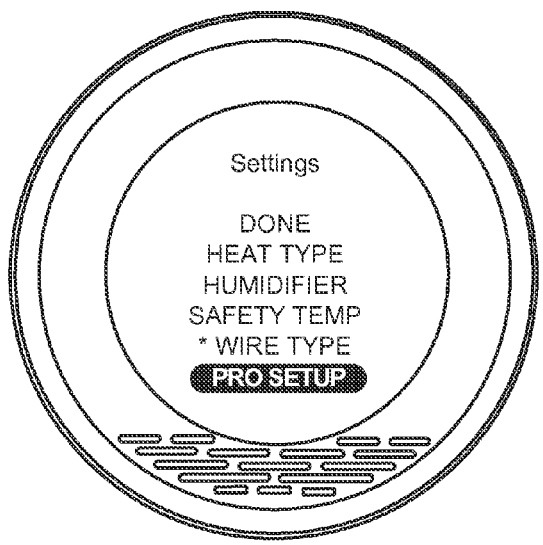 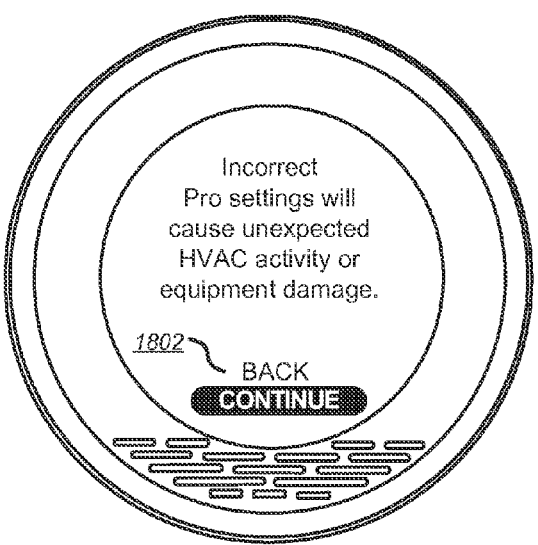
FIG. 18A                    FIG. 18B

HVAC CONTROLLER WITH USER-FRIENDLY INSTALLATION FEATURES FACILITATING BOTH DO-IT-YOURSELF AND PROFESSIONAL INSTALLATION SCENARIOS

CROSS-REFERENCES TO RELATED APPLICATIONS

This application claims the benefit of the following commonly assigned applications, each of which is incorporated by reference herein: U.S. Ser. No. 13/269,501 filed Oct. 7, 2011; and U.S. Provisional Application No. 61/627,996 filed Oct. 21, 2011.

TECHNICAL FIELD

This patent specification relates to systems and methods for the monitoring and control of energy-consuming systems or other resource-consuming systems. More particularly, this patent specification relates to control units that govern the operation of energy-consuming systems, household devices, or other resource-consuming systems, including methods for activating electronic displays for thermostats that govern the operation of heating, ventilation, and air conditioning (HVAC) systems.

BACKGROUND OF THE INVENTION

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Historically, however, most known HVAC thermostatic control systems have tended to fall into one of two opposing categories, neither of which is believed be optimal in most practical home environments. In a first category are many simple, non-programmable home thermostats, each typically consisting of a single mechanical or electrical dial for setting a desired temperature and a single HEAT-FAN-OFF-AC switch. While being easy to use for even the most unsophisticated occupant, any energy-saving control activity, such as adjusting the nighttime temperature or turning off all heating/cooling just before departing the home, must be performed manually by the user. As such, substantial energy-saving opportunities are often missed for all but the most vigilant users. Moreover, more advanced energy-saving settings are not provided, such as the ability to specify a custom temperature swing, i.e., the difference between the desired set temperature and actual current temperature (such as 1 to 3 degrees) required to trigger turn-on of the heating/cooling unit.

In a second category, on the other hand, are many programmable thermostats, which have become more prevalent in recent years in view of Energy Star (US) and TCO (Europe) standards, and which have progressed considerably in the number of different settings for an HVAC system that can be individually manipulated. Unfortunately, however, users are often intimidated by a dizzying array of switches and controls laid out in various configurations on the face of the thermostat or behind a panel door on the thermostat, and seldom adjust the manufacturer defaults to optimize their own energy usage. Thus, even though the installed programmable thermostats in a large number of homes are technologically capable of operating the HVAC equipment with energy-saving profiles, it is often the case that only the one-size-fits-all manufacturer default profiles are ever implemented in a large number of homes. Indeed, in an unfortunately large number of cases, a home user may permanently operate the unit in a "temporary" or "hold" mode, manually manipulating the displayed set temperature as if the unit were a simple, non-programmable thermostat.

In a more general sense, important issues arise at the interface between (i) energy-saving technologies that might be achievable using known sensing and processing methods, and (ii) the actual widespread user adoption of devices that implement such energy-saving technologies and the integration of those devices into their daily routines and environment. It has been found especially important that the "first contact" between a user and an energy-saving device constitute a particularly easy, enjoyable, and pleasant experience, or else the user can quickly "turn off" or "tune out" to the device and its energy-saving advantages.

Although the scope of the present teachings hereinbelow is not necessarily limited to thermostats but rather can extend to a variety of different smart-home devices, the installation of an intelligent, energy-saving, network-connected thermostat presents particular issues that are well addressed by one or more of the embodiments herein. One the one hand, it is desirable to provide an intelligent, energy-saving, network-connected a thermostat that accommodates easy do-it-yourself installation for ordinary users who desire to perform their own installation. On the other hand, because HVAC equipment configurations in some homes can get rather complex, and because the consequences of improper installation can sometimes be severe, it is sometimes important that professionals get involved in the installation process.

It would be desirable to provide an intelligent, energy-saving, network-connected thermostat that can provide both do-it-yourself simplicity in scenarios where that is proper and safe, and yet that also has the ability to accommodate more complex HVAC systems and identify the potential need for professional assistance, all while being user-friendly and providing a pleasing first contact with the user as well as any professionals who may ultimately get involved. Other issues arise as would be apparent to a person skilled in the art in view of the present disclosure.

BRIEF SUMMARY OF THE INVENTION

According to one embodiment, a thermostat may be presented. The thermostat may include a housing, a user interface comprising an electronic display, and a processing system disposed within the housing and coupled to the user interface. The processing system may be configured to be in operative communication with one or more temperature sensors for determining an ambient air temperature, in operative communication with one or more input devices including said user interface for determining a setpoint temperature value, and in still further operative communication with a heating, ventilation, and air conditioning (HVAC) system to control the HVAC system based at least in part on a comparison of a measured ambient temperature and the setpoint temperature value. The thermostat may also include a plurality of HVAC connectors configured to receive a corresponding plurality of HVAC control wires corresponding to the HVAC system, each HVAC connector having an identifier that identifies one or more HVAC functionalities associated with that HVAC connector. The thermostat may additionally include, a connection sensing module coupled to the plurality of HVAC connectors and configured to determine the identities of a first subset of the plurality of HVAC connectors into which corresponding HVAC wires have been inserted, wherein the processing system is further configured to process the identities of the first subset of HVAC connectors to determine a configuration of the HVAC system to be controlled. In one embodiment, the processing may include identifying, based on said identities of the first subset of HVAC connectors, whether (i) only a single possible HVAC system configuration is indicated thereby, or (ii) multiple possible HVAC system configurations are indicated thereby. The processing may further include operating, if the single possible HVAC system configuration is indicated, the HVAC system according to said single possible HVAC system configuration. The processing may additionally include resolving, if the multiple possible HVAC system configurations are indicated, a particular one of the multiple possible HVAC system configurations that is applicable based on at least one user response to at least one inquiry to a user presented on the user interface, and operating the HVAC system according to the resolved particular HVAC system configuration.

In another embodiment, a method of determining HVAC system configuration for an HVAC system for control by a thermostat may be presented. The method may include determining the identities of a first subset of a plurality of HVAC connectors into which corresponding HVAC wires have been inserted, wherein the plurality of HVAC connectors are configured to receive a corresponding plurality of HVAC control wires corresponding to the HVAC system, each HVAC connector having an identifier that identifies one or more HVAC functionalities associated with that HVAC connector. The method may also include identifying, based on the identities of the first subset of HVAC connectors, whether (i) only a single possible HVAC system configuration is indicated thereby, or (ii) multiple possible HVAC system configurations are indicated thereby. The method may additionally include operating, if the single possible HVAC system configuration is indicated, the HVAC system according to the single possible HVAC system configuration. The method may further include resolving, if the multiple possible HVAC system configurations are indicated, a particular one of the multiple possible HVAC system configurations that is applicable based on at least one user response to at least one inquiry to a user presented on a user interface comprising an electronic display, and operating said HVAC system according to the resolved particular HVAC system configuration. In one embodiment, the resolving is performed at least in part by a processing system disposed within a housing of a thermostat and coupled to the user interface, the processing system being configured to be in operative communication with one or more temperature sensors for determining an ambient air temperature, in operative communication with one or more input devices including said user interface for determining a setpoint temperature value, and in still further operative communication with the HVAC system to control the HVAC system based at least in part on a comparison of a measured ambient temperature and the setpoint temperature value.

In yet another embodiment, another thermostat may be presented. The thermostat may include a housing, a user interface, a processing system communicatively coupled to the user interface and disposed within the housing, a power stealing circuit coupled to the processing system and configured to provide power to the user interface using a rechargeable battery, a plurality of HVAC connectors configured to receive a corresponding plurality of HVAC control wires, and a connection sensing module coupled to the plurality of HVAC connectors and configured to provide an indication to the processing system whether a wire is mechanically inserted for each of the plurality of HVAC connectors. The processing system may be configured to determine an HVAC system configuration by identifying a subset of the plurality of HVAC connectors into which a wire has been mechanically inserted, identifying an ambiguity resulting from the subset, providing an indication via the user interface based on the ambiguity, resolving the ambiguity in accordance with an input provided to the user interface, determining the HVAC system configuration; and operating the HVAC system in accordance with the HVAC system configuration.

A further understanding of the nature and advantages of the present invention may be realized by reference to the remaining portions of the specification and the drawings. Also note that other embodiments may be described in the following disclosure and claims.

BRIEF DESCRIPTION OF THE DRAWINGS

FIGS. 7A-7B are diagrams showing a thermostat backplate having a plurality of wiring terminals, according to some embodiments.

FIG. 18A illustrates a settings screen for accessing a professional setup interface.

FIG. 18B illustrates a warning that may be displayed for professional setup, according to one embodiment.

DETAILED DESCRIPTION OF THE INVENTION

Figure 1:
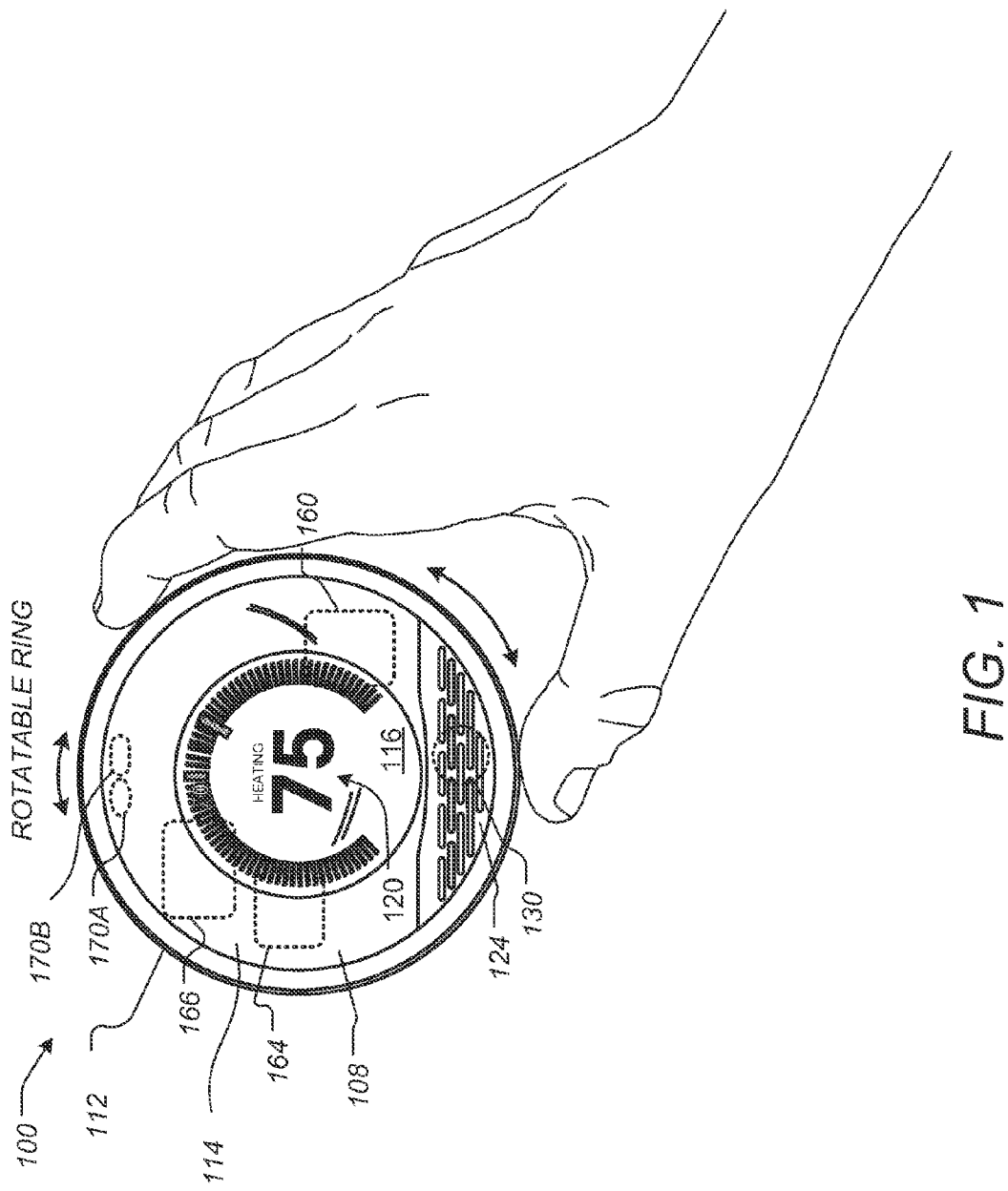
FIG. 1 illustrates a perspective view of a thermostat, according to one embodiment.

The subject matter of this patent specification relates to the subject matter of the following commonly assigned applications, each of which is incorporated by reference herein: U.S. Ser. No. 13/034,666 filed Feb. 24, 2011; U.S. Ser. No. 13/038, 191 filed Mar. 1, 2011; U.S. Ser. No. 13/467,029 filed May 8, 2012; and U.S. Ser. No. 13/624,878 filed Sep. 21, 2012. The above-referenced patent applications are collectively referenced herein as "the commonly-assigned incorporated applications."

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC system used in a residential home, such as single-family residential home, the scope of the present teachings is not so limited. More generally, thermostats according to one or more of the preferred embodiments are applicable for a wide variety of enclosures having one or more HVAC systems including, without limitation, duplexes, townhomes, multi-unit apartment buildings, hotels, retail stores, office buildings, and industrial buildings. Further, it is to be appreciated that while the terms user, customer, installer, homeowner, occupant, guest, tenant, landlord, repair person, and/or the like may be used to refer to the person or persons who are interacting with the thermostat or other device or user interface in the context of one or more scenarios described herein, these references are by no means to be considered as limiting the scope of the present teachings with respect to the person or persons who are performing such actions.

Exemplary Thermostat Embodiments

Provided according to one or more embodiments are systems, methods, and computer program products for controlling one or more HVAC systems based on one or more versatile sensing and control units (VSCU units), each VSCU unit being configured and adapted to provide sophisticated, customized, energy-saving HVAC control functionality while at the same time being visually appealing, non-intimidating, and easy to use. The term "thermostat" is used herein below to represent a particular type of VSCU unit (Versatile Sensing and Control) that is particularly applicable for HVAC control in an enclosure. Although "thermostat" and "VSCU unit" may be seen as generally interchangeable for the contexts of HVAC control of an enclosure, it is within the scope of the present teachings for each of the embodiments herein to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy.

FIGS. 1-5 and the descriptions in relation thereto provide exemplary embodiments of thermostat hardware and/or software that can be used to implement the specific embodiments of the appended claims. This thermostat hardware and/or software is not meant to be limiting, and is presented to provide an enabling disclosure. FIG. 1 illustrates a perspective view of a thermostat 100, according to one embodiment. In this specific embodiment, the thermostat 100 can be controlled by at least two types of user input, the first being a rotation of the outer ring 112, and the second being an inward push on an outer cap 108 until an audible and/or tactile "click" occurs. As used herein, these two types of user inputs, may be referred to as "manipulating" the thermostat. In other embodiments, manipulating the thermostat may also include pressing keys on a keypad, voice recognition commands, and/or any other type of input that can be used to change or adjust settings on the thermostat 100.

For this embodiment, the outer cap 108 can comprise an assembly that includes the outer ring 112, a cover 114, an electronic display 116, and a metallic portion 124. Each of these elements, or the combination of these elements, may be referred to as a "housing" for the thermostat 100. Simultaneously, each of these elements, or the combination of these elements, may also form a user interface. The user interface may specifically include the electronic display 116. In FIG. 1, the user interface 116 may be said to operate in an active display mode. The active display mode may include providing a backlight for the electronic display 116. In other embodiments, the active display mode may increase the intensity and/or light output of the electronic display 116 such that a user can easily see displayed settings of the thermostat 100, such as a current temperature, a setpoint temperature, an HVAC function, and/or the like. The active display mode may be contrasted with an inactive display mode (not shown). The inactive display mode can disable a backlight, reduce the amount of information displayed, lessen the intensity of the display, and/or altogether turn off the electronic display 116, depending on the embodiment.

Depending on the settings of the thermostat 100, the active display mode and the inactive display mode of the electronic display 116 may also or instead be characterized by the relative power usage of each mode. In one embodiment, the active display mode may generally require substantially more electrical power than the inactive display mode. In some embodiments, different operating modes of the electronic display 116 may instead be characterized completely by their power usage. In these embodiments, the different operating modes of the electronic display 116 may be referred to as a first mode and a second mode, where the user interface requires more power when operating in the first mode than when operating in the second mode.

According to some embodiments the electronic display 116 may comprise a dot-matrix layout (individually addressable) such that arbitrary shapes can be generated, rather than being a segmented layout. According to some embodiments, a combination of dot-matrix layout and segmented layout is employed. According to some embodiments, electronic display 116 may be a backlit color liquid crystal display (LCD). An example of information displayed on the electronic display 116 is illustrated in FIG. 1, and includes central numerals 120 that are representative of a current setpoint temperature. According to some embodiments, metallic portion 124 can have a number of slot-like openings so as to facilitate the use of a sensors 130, such as a passive infrared motion sensor (PIR), mounted beneath the slot-like openings.

According to some embodiments, the thermostat 100 can include additional components, such as a processing system 160, display driver 164, and a wireless communications system 166. The processing system 160 can adapted or configured to cause the display driver 164 to cause the electronic display 116 to display information to the user. The processing system 160 can also be configured to receive user input via the rotatable ring 112. These additional components, including the processing system 160, can be enclosed within the housing, as displayed in FIG. 1. These additional components are described in further detail herein below.

The processing system 160, according to some embodiments, is capable of carrying out the governance of the thermostat's operation. For example, processing system 160 can be further programmed and/or configured to maintain and update a thermodynamic model for the enclosure in which the HVAC system is installed. According to some embodiments, the wireless communications system 166 can be used to communicate with devices such as personal computers, remote servers, handheld devices, smart phones, and/or other thermostats or HVAC system components. These communications can be peer-to-peer communications, communications through one or more servers located on a private network, or and/or communications through a cloud-based service.

Motion sensing as well as other techniques can be use used in the detection and/or prediction of occupancy, as is described further in the commonly assigned U.S. Ser. No. 12/881,430, supra. According to some embodiments, occupancy information can be a used in generating an effective and efficient scheduled program. For example, an active proximity sensor 170A can be provided to detect an approaching user by infrared light reflection, and an ambient light sensor 170B can be provided to sense visible light. The proximity sensor 170A can be used in conjunction with a plurality of other sensors to detect proximity in the range of about one meter so that the thermostat 100 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place or about to take place. The various types of sensors that may be used, as well as the operation of the "wake up" function are described in much greater detail throughout the remainder of this disclosure.

Figure 2:
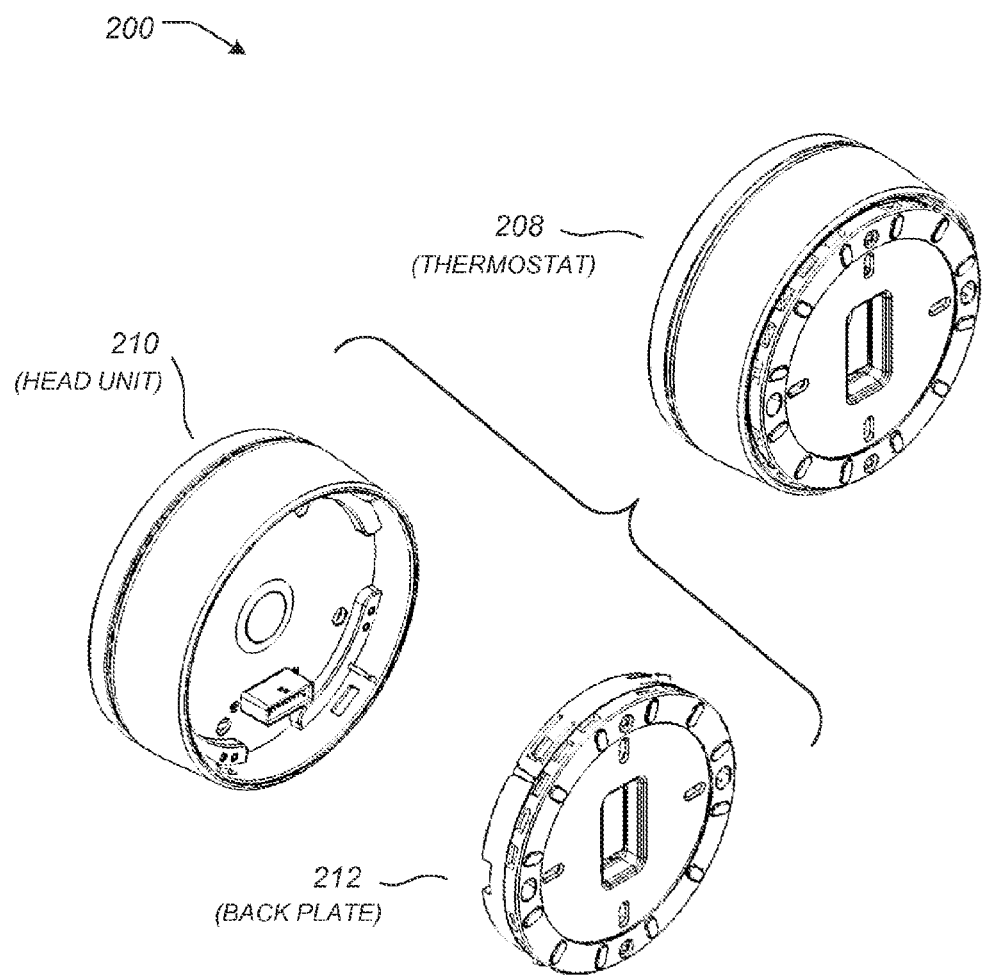
FIG. 2 illustrates an exploded perspective view of a thermostat having a head unit and the backplate, according to one embodiment.

In some embodiments, the thermostat can be physically and/or functionally divided into at least two different units. Throughout this disclosure, these two units can be referred to as a head unit and a backplate. FIG. 2 illustrates an exploded perspective view 200 of a thermostat 208 having a head unit 210 and a backplate 212, according to one embodiment. Physically, this arrangement may be advantageous during an installation process. In this embodiment, the backplate 212 can first be attached to a wall, and the HVAC wires can be attached to a plurality of HVAC connectors on the backplate 212. Next, the head unit 210 can be connected to the backplate 212 in order to complete the installation of the thermostat 208.

Figure 3A:
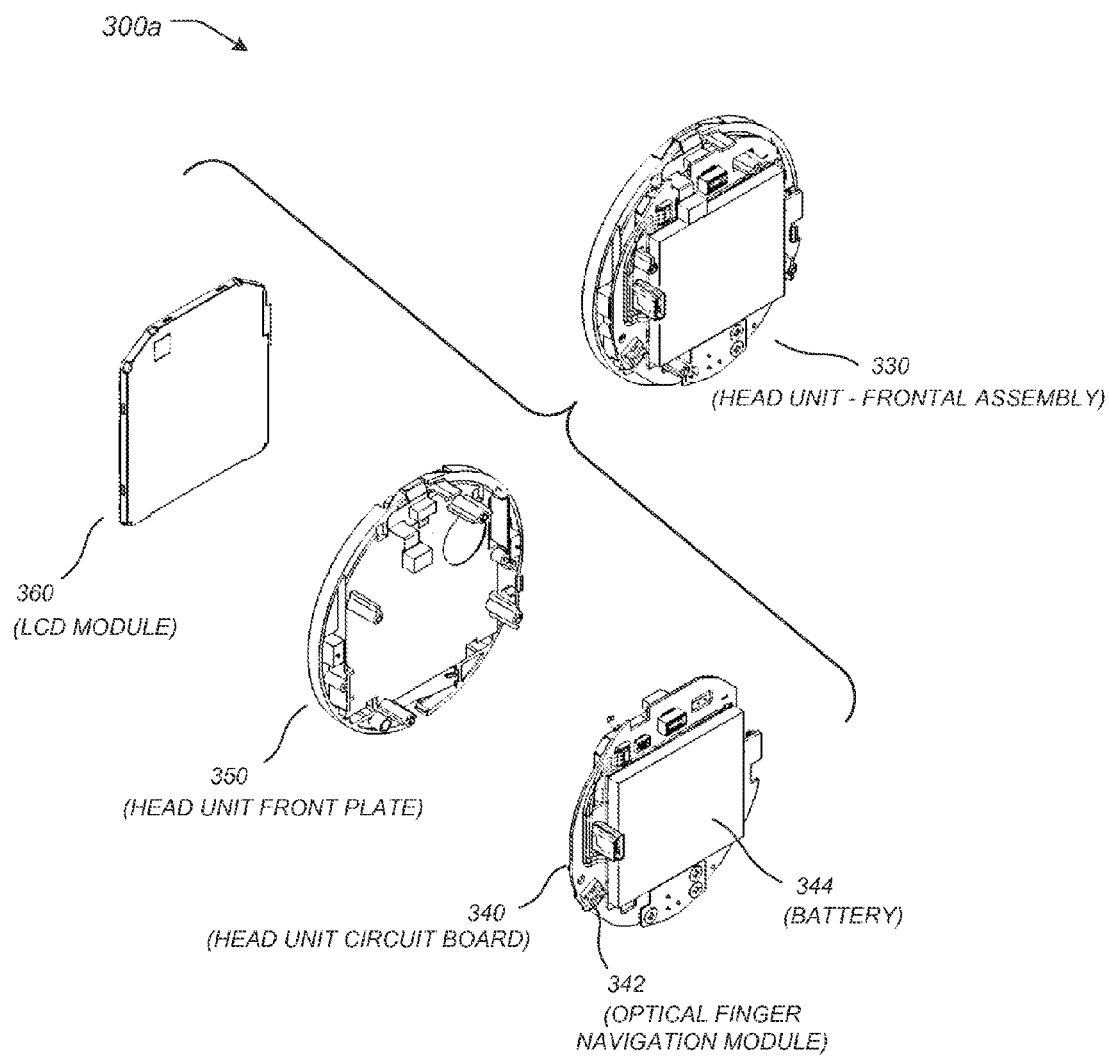
FIG. 3A illustrates an exploded perspective view of a head unit with respect to its primary components, according to one embodiment.

FIG. 3A illustrates an exploded perspective view 300a of a head unit 330 with respect to its primary components, according to one embodiment. Here, the head unit 330 may include an electronic display 360. According to this embodiment, the electronic display 360 may comprise an LCD module. Furthermore, the head unit 330 may include a mounting assembly 350 used to secure the primary components in a completely assembled head unit 330. The head unit 330 may further include a circuit board 340 that can be used to integrate various electronic components described further below. In this particular embodiment, the circuit board 340 of the head unit 330 can include a manipulation sensor 342 to detect user manipulations of the thermostat. In embodiments using a rotatable ring, the manipulation sensor 342 may comprise an optical finger navigation module as illustrated in FIG. 3A. A rechargeable battery 344 may also be included in the assembly of the head unit 330. In one preferred embodiment, rechargeable battery 344 can be a Lithium-Ion battery, which may have a nominal voltage of 3.7 volts and a nominal capacity of 560 mAh.

Figure 3B:
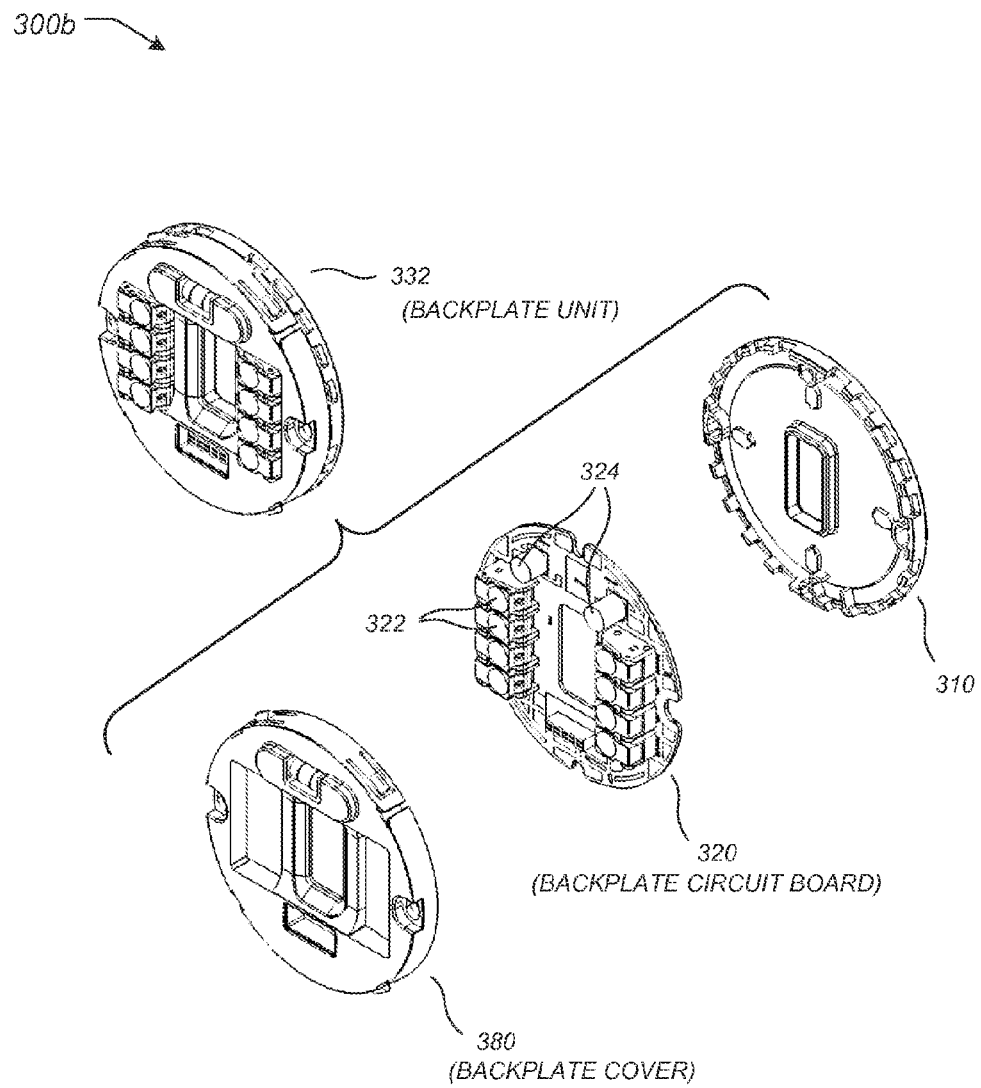
FIG. 3B illustrates an exploded perspective view of a backplate with respect to its primary components, according to one embodiment.

FIG. 3B illustrates an exploded perspective view 300b of a backplate 332 with respect to its primary components, according to one embodiment. The backplate 332 may include a frame 310 that can be used to mount, protect, or house a backplate circuit board 320. The backplate circuit board 320 may be used to mount electronic components, including one or more processing functions, and/or one or more HVAC wire connectors 322. The one or more HVAC wire connectors 322 may include integrated wire insertion sensing circuitry configured to determine whether or not a wire is mechanically and/or electrically connected to each of the one or more HVAC wire connectors 322. In this particular embodiment, two relatively large capacitors 324 are a part of power stealing circuitry that can be mounted to the backplate circuit board 320. The power stealing circuitry is discussed further herein below.

Figure 4A:
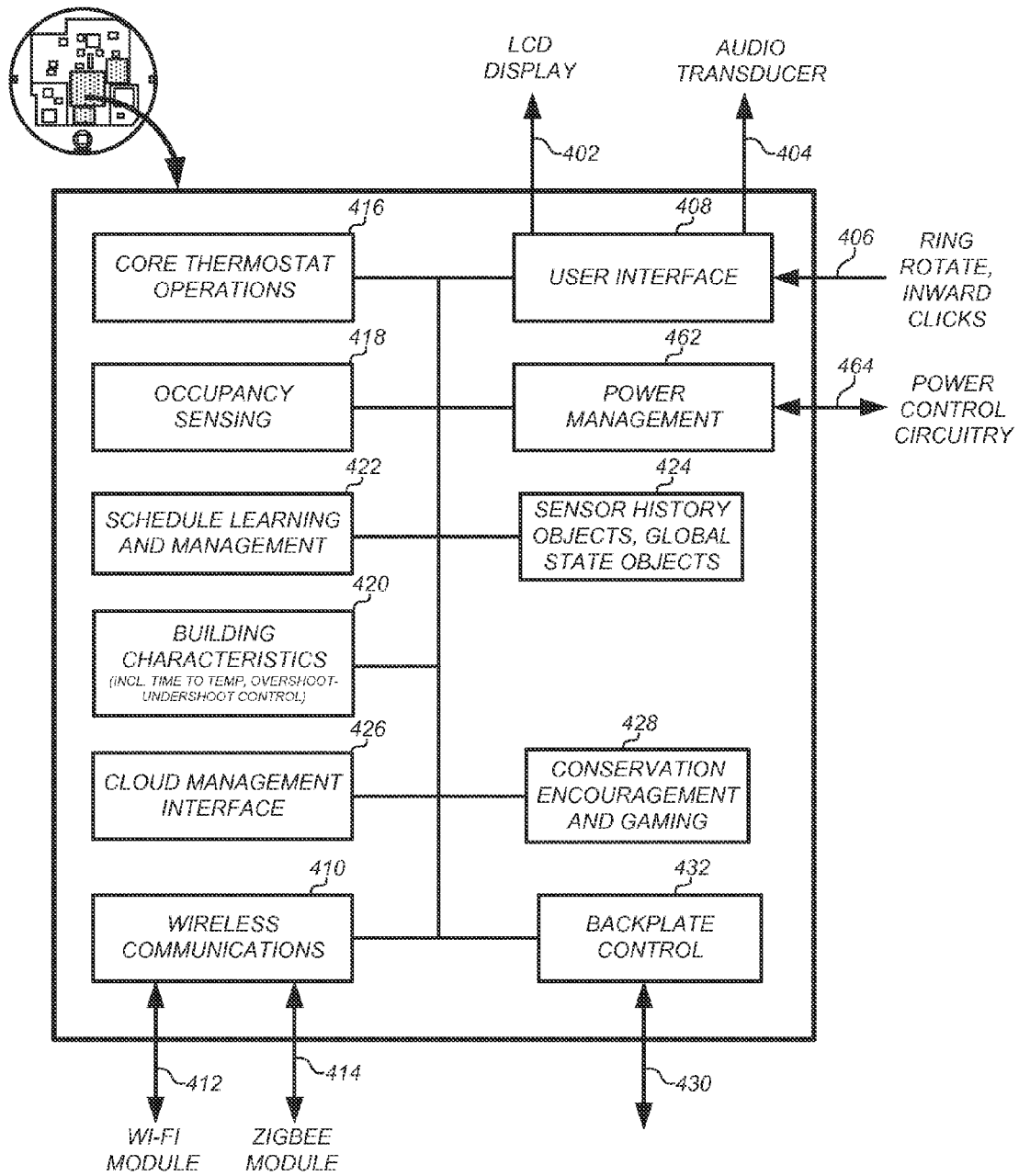
FIG. 4A illustrates a simplified functional block diagram for a head unit, according to one embodiment.

In addition to physical divisions within the thermostat that simplify installation process, the thermostat may also be divided functionally between the head unit and the backplate. FIG. 4A illustrates a simplified functional block diagram 400a for a head unit, according to one embodiment. The functions embodied by block diagram 400a are largely self-explanatory, and may be implemented using one or more processing functions. As used herein, the term "processing function" may refer to any combination of hardware and/or software. For example, a processing function may include a microprocessor, a microcontroller, distributed processors, a lookup table, digital logic, logical/arithmetic functions implemented in analog circuitry, and/or the like. A processing function may also be referred to as a processing system, a processing circuit, or simply a circuit.

In this embodiment, a processing function on the head unit may be implemented by an ARM processor. The head unit processing function may interface with the electronic display 402, an audio system 404, and a manipulation sensor 406 as a part of a user interface 408. The head unit processing function may also facilitate wireless communications 410 by interfacing with various wireless modules, such as a Wi-Fi module 412 and/or a ZigBee module 414. Furthermore, the head unit processing function may be configured to control the core thermostat operations 416, such as operating the HVAC system. The head unit processing function may further be configured to determine or sense occupancy 418 of a physical location, and to determine building characteristics 420 that can be used to determine time-to-temperature characteristics. Using the occupancy sensing 418, the processing function on the head unit may also be configured to learn and manage operational schedules 422, such as diurnal heat and cooling schedules. A power management module 462 may be used to interface with a corresponding power management module on the back plate, the rechargeable battery, and a power control circuit 464 on the back plate.

Additionally, the head unit processing function may include and/or be communicatively coupled to one or more memories. The one or more memories may include one or more sets of instructions that cause the processing function to operate as described above. The one or more memories may also include a sensor history and global state objects 424. The one or more memories may be integrated with the processing function, such as a flash memory or RAM memory available on many commercial microprocessors. The head unit processing function may also be configured to interface with a cloud management system 426, and may also operate to conserve energy wherever appropriate 428. An interface 432 to a backplate processing function 430 may also be included, and may be implemented using a hardware connector.

Figure 4B:
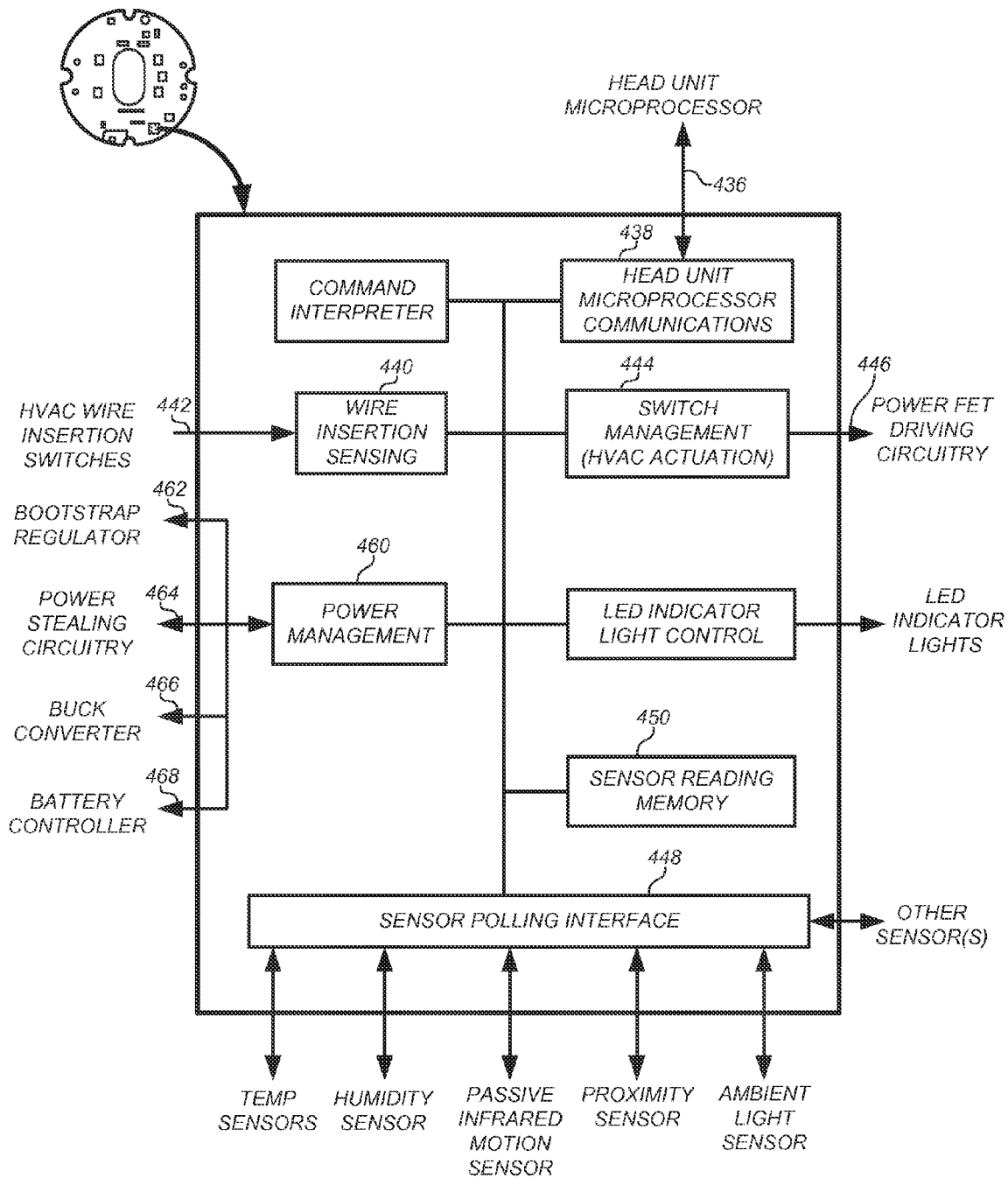
FIG. 4B illustrates a simplified functional block diagram for a backplate, according to one embodiment.

FIG. 4B illustrates a simplified functional block diagram for a backplate, according to one embodiment. Using an interface 436 that is matched to the interface 432 shown in FIG. 4A, the backplate processing function can communicate with the head unit processing function 438. The backplate processing function can include wire insertion sensing 440 that is coupled to external circuitry 442 configured to provide signals based on different wire connection states. The backplate processing function may be configured to manage the HVAC switch actuation 444 by driving power FET circuitry 446 to control the HVAC system.

The backplate processing function may also include a sensor polling interface 448 to interface with a plurality of sensors. In this particular embodiment, the plurality of sensors may include a temperature sensor, a humidity sensor, a PIR sensor, a proximity sensor, an ambient light sensor, and or other sensors not specifically listed. This list is not meant to be exhaustive. Other types of sensors may be used depending on the particular embodiment and application, such as sound sensors, flame sensors, smoke detectors, and/or the like. The sensor polling interface 448 may be communicatively coupled to a sensor reading memory 450. The sensor reading memory 450 can store sensor readings and may be located internally or externally to a microcontroller or microprocessor.

Finally, the backplate processing function can include a power management unit 460 that is used to control various digital and/or analog components integrated with the backplate and used to manage the power system of the thermostat. Although one having skill in the art will recognize many different implementations of a power management system, the power management system of this particular embodiment can include a bootstrap regulator 462, a power stealing circuit 464, a buck converter 466, and/or a battery controller 468.

Figure 5:
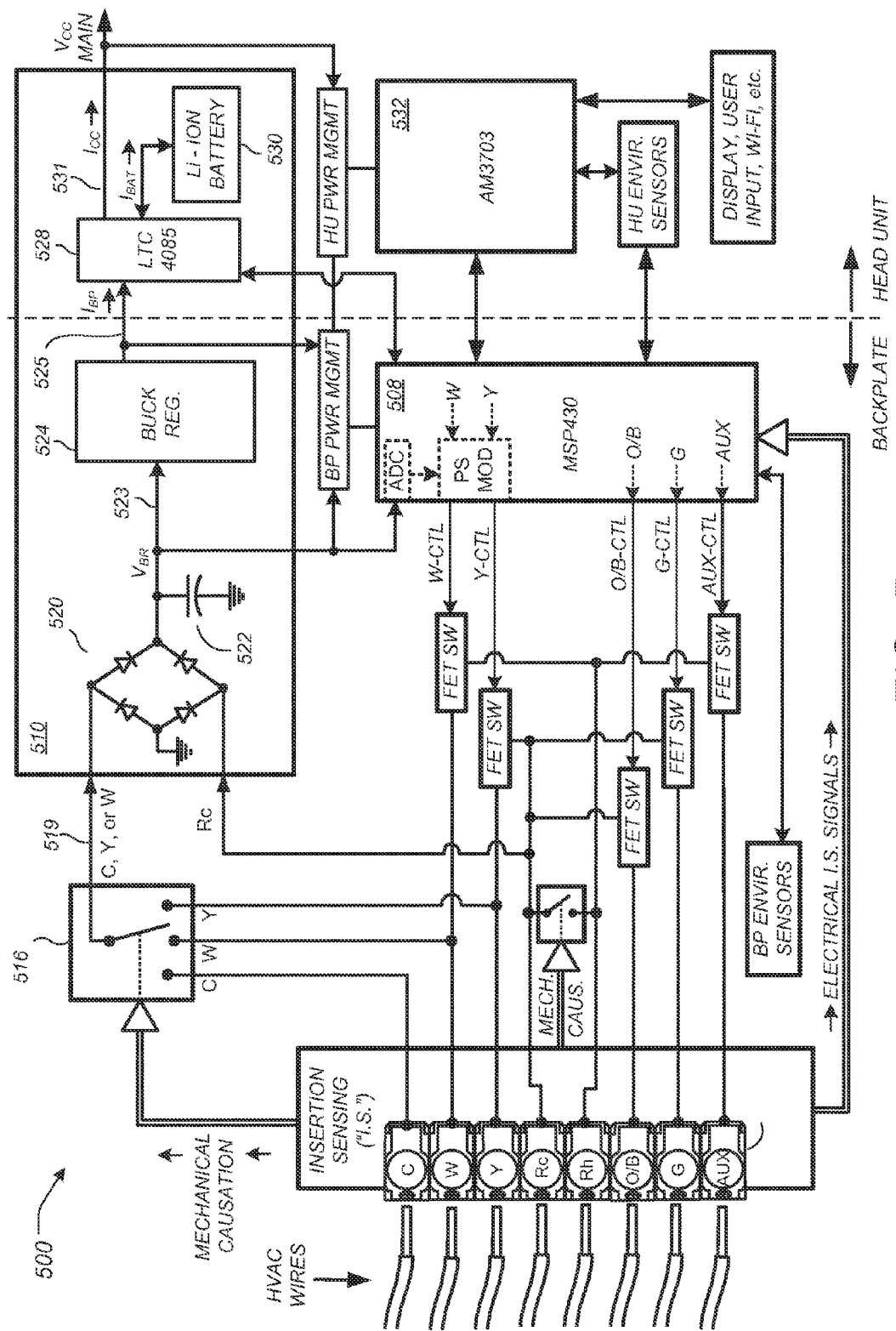
FIG. 5 illustrates a simplified circuit diagram of a system for managing the power consumed by a thermostat, according to one embodiment.

FIG. 5 illustrates a simplified circuit diagram 500 of a system for managing the power consumed by a thermostat, according to one embodiment. The powering circuitry 510 comprises a full-wave bridge rectifier 520, a storage and waveform-smoothing bridge output capacitor 522 (which can be, for example, on the order of 30 microfarads), a buck regulator circuit 524, a power-and-battery (PAB) regulation circuit 528, and a rechargeable lithium-ion battery 530. In conjunction with other control circuitry including backplate power management circuitry 527, head unit power management circuitry 529, and the microcontroller 508, the powering circuitry 510 can be configured and adapted to have the characteristics and functionality described herein below. Description of further details of the powering circuitry 510 and associated components can be found elsewhere in the instant disclosure and/or in the commonly assigned U.S. Ser. No. 13/034,678, supra, and U.S. Ser. No. 13/267,871, supra.

By virtue of the configuration illustrated in FIG. 5, when there is a "C" wire presented upon installation, the powering circuitry 510 operates as a relatively high-powered, rechargeable-battery-assisted AC-to-DC converting power supply. When there is not a "C" wire presented, the powering circuitry 510 operates as a power-stealing, rechargeable-battery-assisted AC-to-DC converting power supply. The powering circuitry 510 generally serves to provide the voltage Vcc MAIN that is used by the various electrical components of the thermostat, which in one embodiment can be about 4.0 volts. For the case in which the "C" wire is present, there is no need to worry about accidentally tripping (as there is in inactive power stealing) or untripping (for active power stealing) an HVAC call relay, and therefore relatively large amounts of power can be assumed to be available. Generally, the power supplied by the "C" wire will be greater than the instantaneous power required at any time by the remaining circuits in the thermostat.

However, a "C" wire will typically only be present in about 20% of homes. Therefore, the powering circuitry 510 may also be configured to "steal" power from one of the other HVAC wires in the absence of a "C" wire. As used herein, "inactive power stealing" refers to the power stealing that is performed during periods in which there is no active call in place based on the lead from which power is being stolen. Thus, for cases where it is the "Y" lead from which power is stolen, "inactive power stealing" refers to the power stealing that is performed when there is no active cooling call in place. As used herein, "active power stealing" refers to the power stealing that is performed during periods in which there is an active call in place based on the lead from which power is being stolen. Thus, for cases where it is the "Y" lead from which power is stolen, "active power stealing" refers to the power stealing that is performed when there is an active cooling call in place. During inactive or active power stealing, power can be stolen from a selected one of the available call relay wires. While a complete description of the power stealing circuitry 510 can be found in the commonly assigned applications that have been previously incorporated herein by reference, the following brief explanation is sufficient for purposes of this disclosure.

Some components in the thermostat, such as the head unit processing function, the user interface, and/or the electronic display may consume more instantaneous power than can be provided by power stealing alone. When these more power-hungry components are actively operating, the power supplied by power stealing can be supplemented with the rechargeable battery 530. In other words, when the thermostat is engaged in operations, such as when the electronic display is in an active display mode, power may be supplied by both power stealing and the rechargeable battery 530. In order to preserve the power stored in the rechargeable battery 530, and to give the rechargeable battery 530 an opportunity to recharge, some embodiments optimize the amount of time that the head unit processing function and the electronic display are operating in an active mode. In other words, it may be advantageous in some embodiments to keep the head unit processing function in a sleep mode or low power mode and to keep the electronic display in an inactive display mode as long as possible without affecting the user experience.

When the head unit processing function and the electronic display are in an inactive or sleep mode, the power consumed by the thermostat is generally less than the power provided by power stealing. Therefore, the power that is not consumed by the thermostat can be used to recharge the rechargeable battery 530. In this embodiment, the backplate processing function 508 (MSP430) can be configured to monitor the environmental sensors in a low-power mode, and then wake the head unit processing function 532 (AM3703) when needed to control the HVAC system, etc. Similarly, the backplate processing function 508 can be used to monitor sensors used to detect the closeness of a user, and wake the head unit processing system 532 and/or the electronic display when it is determined that a user intends to interface with the thermostat.

It will be understood by one having skill in the art that the various thermostat embodiments depicted and described in relation to FIGS. 1-5 are merely exemplary and not meant to be limiting. Many other hardware and/or software configurations may be used to implement a thermostat and the various functions described herein below. These embodiments should be seen as an exemplary platform in which the following embodiments can be implemented to provide an enabling disclosure. Of course, the following methods, systems, and/or software program products could also be implemented using different types of thermostats, different hardware, and/or different software.

Figure 6:
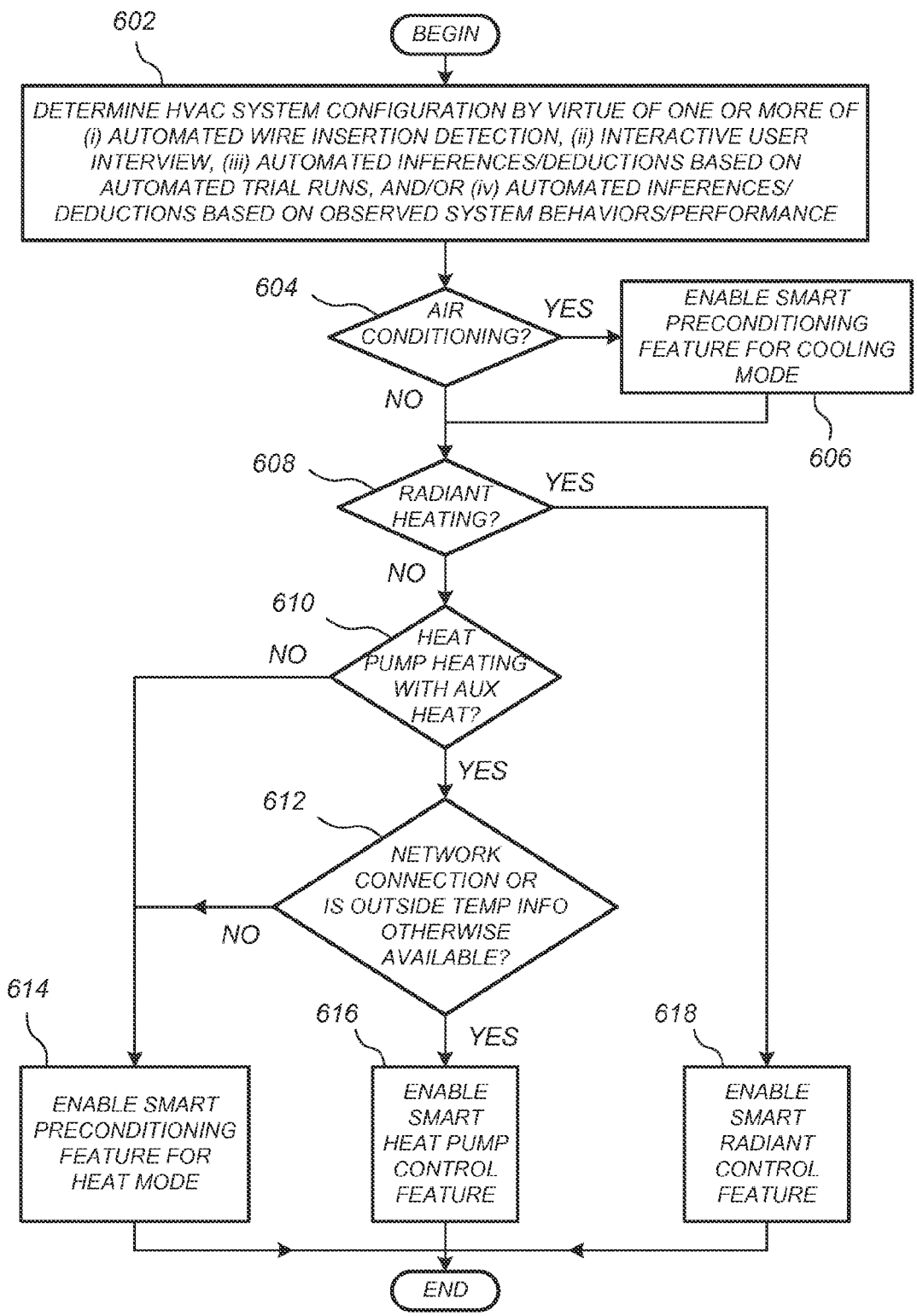
FIG. 6 illustrates steps for automated system matching that can be carried out by a thermostat, according to one embodiment.

FIG. 6 illustrates steps for automated system matching that are preferably carried out by the same thermostat or thermostatic control system that carries out one or more of the other HVAC control methods that are described in the instant patent specification. It has been found particularly desirable to make thermostat setup and governance as user-friendly as possible by judiciously automating the selection of which among a variety of available energy-saving and comfort-promoting control algorithms are appropriate for the particular HVAC configuration of the home in which the thermostat is installed. At step 602, the HVAC system features available for control by the thermostat are determined by virtue of at least one of (i) automated wire insertion detection, (ii) interactive user interview, (iii) automated inferences or deductions based on automated trial runs of the HVAC system at or near the time of thermostat installation, and (iv) automated inferences or deductions based on observed system behaviors or performance. Examples of such methods are described in one or more of the commonly assigned US20120130679A1 and US20120203379A1, as well as the present application.

In relation to cooling mode operation, if it is determined that the HVAC system includes air conditioning (step 604), which may be by virtue of a dedicated air conditioning system and/or a heat pump operating in the cooling direction, then at step 606 there is enabled a smart preconditioning feature for cooling mode operation. One example of a particularly advantageous smart preconditioning feature is described in the commonly assigned U.S. Ser. No. 13/632,150, filed even date herewith and entitled, "Preconditioning Controls and Methods for an Environmental Control System", which is incorporated by reference herein. For some embodiments, the smart preconditioning algorithm is configured to: constantly learn how fast the home heats up or cools down by monitoring the recent heating and cooling history of the home, optionally incorporating external environmental information such as outside temperatures, sun heating effects, etc.; predict how long the HVAC system will need to actively heat or cool in order to reach a particular scheduled setpoint; and begin preconditioning toward the particular scheduled setpoint at just the right time such that the scheduled setpoint temperature will be reached at the scheduled setpoint time. User comfort is promoted by virtue of not reaching the scheduled setpoint temperature too late, while energy savings is promoted by virtue of not reaching the scheduled setpoint temperature too early.

In relation to heating mode operation, if it is determined that the HVAC system includes radiant heating (step 608), then at step 618 there is enabled a smart radiant control feature for heating mode operation. One example of a particularly advantageous smart radiant control feature is described in the commonly assigned U.S. Ser. No. 13/632,152, filed even date herewith and entitled, "Radiant Heating Controls and Methods for an Environmental Control System", which is incorporated by reference herein. For some embodiments, the smart radiant control feature is configured to monitor radiant heating cycles on an ongoing basis, compute an estimated thermal model of the home as heated by the radiant system, and predictively control the radiant system in a manner that takes into account the thermal model of the house, the time of day, and the previous heat cycle information. The smart radiant control feature is configured to achieve comfortable maintenance band temperatures while also minimizing frequent changes in HVAC on/off states and minimizing HVAC energy consumption. Among other advantages, uncomfortable and energy-wasting target temperature overshoots are avoided.

If it is determined that the HVAC system includes a heat pump including auxiliary resistive electrical heating (i.e., so-called auxiliary or AUX heat) (step 610), and if it is further determined (step 612) that the thermostat is network-connected (such that it can receive outside temperature information based on location data and an internet-based temperature information source) or otherwise has access to outside temperature information (such as by wired or wireless connection to an outside temperature sensor), then at step 616 a smart heat pump control feature is enabled. If at step 610 there is not a heat pump with AUX heat (which will most commonly be because there is a conventional gas furnace instead of a heat pump, or else because there is a heat pump in a so-called dual-fuel system that does not include AUX heat), then at step 614 there is enabled a smart preconditioning feature for heat mode, which can be a similar or identical opposing counterpart to the preconditioning feature for cooling mode discussed supra with respect to step 606. Similarly, if at step 612 there is no network connectivity or other access to outside temperature information, then the smart heat pump control feature of step 616 is not enabled and instead the smart preconditioning feature of step 614 is enabled.

In reference to step 616, one example of a particularly advantageous smart heat pump control feature is described in the commonly assigned U.S. Ser. No. 13/632,093, filed even date herewith and entitled, "Intelligent Controller For An Environmental Control System", which is incorporated by reference herein. Although the AUX heat function allows for faster heating of the home, which can be particularly useful at lower outside temperatures at which heat pump compressors alone are of lesser efficacy, the energy costs of using AUX heat can often be two to five times as high as the energy costs of using the heat pump alone. For some embodiments, the smart heat pump control feature is configured to monitor heat pump heating cycles on an ongoing basis, tracking how fast the home is heated (for example, in units of degrees F. per hour) by the heat pump compressor alone in view of the associated outside air temperatures. Based on computed correlations between effective heating rates and outside air temperatures, and further including a user preference setting in a range from "Max Comfort" to "Max Savings" (including a "Balanced" selection in between these end points), the smart heat pump control feature judiciously activates the AUX heating function in a manner that achieves an appropriate balance between user comfort and AUX heating costs. For some embodiments, the factors affecting the judicious invocation of AUX heat include (i) a predicted amount of time needed for the heat pump alone to achieve the current temperature setpoint, (ii) whether the current temperature setpoint resulted from an immediate user control input versus whether it was a scheduled temperature setpoint, and (iii) the particular selected user preference within the "Max Comfort" to "Max Savings" range. Generally speaking, the AUX function determination will be more favorable to invoking AUX heat as the compressor-alone time estimate increases, more favorable to invoking AUX heat for immediate user control inputs versus scheduled setpoints, and more favorable to invoking AUX heat for "Max Comfort" directed preferences than for "Max Savings" directed preferences.

For some embodiments, the smart heat pump control feature further provides for automated adjustment of a so-called AUX lockout temperature, which corresponds to an outside air temperature above which the AUX heat will never be turned on, based on the monitored heat pump heating cycle information and the user preference between "Max Comfort" and "Max Savings." Generally speaking, the AUX lockout temperatures will be lower (leading to less AUX usage) for better-performing heat pumps, and will also be lower (leading to less AUX usage) as the user preference tends toward "Max Savings". For some embodiments in which there is network connectivity available such that overnight temperature forecasts can be provided, the smart heat pump control feature further provides for night time temperature economization in which an overnight setpoint temperature may be raised higher than a normally scheduled overnight setpoint if, based on the overnight temperature forecast, the AUX function would be required to reach a morning setpoint temperature from the normal overnight setpoint temperature when morning comes. Advantageously, in such situations, even though the overnight temperature inside the home is made higher it would otherwise be, the user actually saves energy and money by avoiding the use of the AUX function when morning comes.

According to some embodiments, the determinations made at one or more of steps 608 and 610 can be based on automatically observed HVAC system performance information rather than specific system identification information. For example, it may be the case that a particular heating functionality of an HVAC system is not physically a radiant system, but nevertheless tends to exhibit signs of a high thermal mass combined with substantial control lag, making it similar in nature to a radiant heating system. For such cases, the smart radiant control feature may be enabled to improve performance. Likewise, it may not be the case that the HVAC system has a heat pump with AUX functionality, but it may have a two-stage heating functionality in which the first stage (which type was likely chosen as a first stage because it was more cost-effective) tends to be very slow or "fall behind" at lower outside temperatures, and in which the second stage (which type was likely chosen as a second stage because it was less cost-effective) tends to be very time-effective in heating up the home, thus making the system act very much like a heat pump system with AUX functionality. For such cases, the smart heat pump control feature may be enabled to improve performance.

Automatically Configuring Operational Modes

In modern network-enabled homes, many different types of devices can be used to control various aspects of the home environment, including air temperature, humidity, fan speed, music, television, appliances, and/or the like. These modern control devices may include a number of connections, both wired and wireless, to other household systems. Depending on the complexity of these connections, modern control devices may appear difficult to install to the average homeowner and create a perception that professional installation is required in order to enjoy the benefits of modern control devices.

Presented herein are methods and systems to help simplify the connection configuration process that may otherwise prove daunting to the average homeowner. Specifically, the control device may mechanically or electrically detect the available connections to other systems within an enclosure. The control device may then intelligently analyze these connections and determine the configurations of the other systems. If the control device is able to determine the other system configurations, then the control device can operate in accordance with those configurations without requiring additional user input. However, if the control device is unable to determine these configurations (i.e. multiple system configurations are possible with the same set of connections) then a user interface on the control device may interview the user to acquire the minimal amount of information necessary to pinpoint the other system configurations. Additionally, connection errors can be detected, and -users can be alerted before possible damage can occur to the other systems. These embodiments may simplify the installation process and be configured to only require user input when absolutely necessary.

As various methods and systems for determining and operating in accordance with external system configurations are presented, it will be understood that the ensuing discussion can apply to any control unit as described above. However, throughout the remainder of this disclosure a specific type of implementation will be used, namely a thermostat. It will be understood that the principles described using thermostat hardware and software can be easily applied to other control units by one having skill in the art in light of this disclosure.

In the case of the thermostat, the primary external system with which it will interface is an HVAC system. Generally, an HVAC system can communicate with the thermostat through a plurality of HVAC control wires. Depending on the configuration of the HVAC system, different wires may be available. When replacing an old thermostat with a new modern thermostat, users are typically instructed to record the connection made by each wire to the old thermostat, and then make the same connection to the corresponding connector on the new thermostat. For example, a wire connected to the C terminal of the old thermostat should be connected to the C terminal of the new thermostat.

Simply duplicating in the new thermostat the connections that were made to the old thermostat represents only half of the installation challenge. As will be understood by one having skill in the art, many different HVAC system configurations are possible depending on the climate, the geographic location, the time of year, the age of the home, the natural resources locally available, and/or the like. For example, some homes may operate using a conventional gas-powered heater and a compressor-based air conditioner. Other homes may use a heat pump. Because of the limitations of heat pumps in extreme weather, supplemental systems may be used, such as electrical strip heat, gas heaters, radiant flooring, boilers, and/or the like. Besides heating and air-conditioning, an HVAC system may also provide other features, such as humidifiers, dehumidifiers, fans, emergency heating, and/or the like.

When certain wire connections between the HVAC system and the thermostat are found to exist, a reliable inference can sometimes be made as to at least part of an HVAC system configuration. For example, if a wire is connected between the HVAC system and the O/B connector of the thermostat, then it can be reliably inferred that the HVAC system uses a heat pump. Therefore, by analyzing each of the connections to the thermostat, some or all of the system configuration can be deduced. The difficulty lies in the fact that different HVAC system configurations may use similar wire connections to the thermostat. Thus, every HVAC system configuration cannot be deduced based solely on the wire connections. For example, in a conventional system the Y1 wire may be used to activate an air conditioner, whereas in a heat pump system, the Y1 wire may be used to activate the heat pump in cooperation with an O/B wire. In a heat pump system, it may not be possible to determine whether the system is dual-fuel or single-fuel based solely on the connections. In these cases, additional user input may be required.

In cases where the HVAC system configuration can be reliably determined based on the wire connections, the thermostat can operate in accordance with that system configuration without requiring additional user input. In cases such as those above where additional information may be required, a user interface of the thermostat may present an interview-style set of questions to the user in order to acquire the needed information. The user interview may include instructions to visit a website to educate the user on different HVAC configurations that will help the user understand their HVAC system. Additionally, the user interview may include a recommendation to contact a professional installer in cases where the user is confused or the HVAC system is complicated.

Figure 7A:
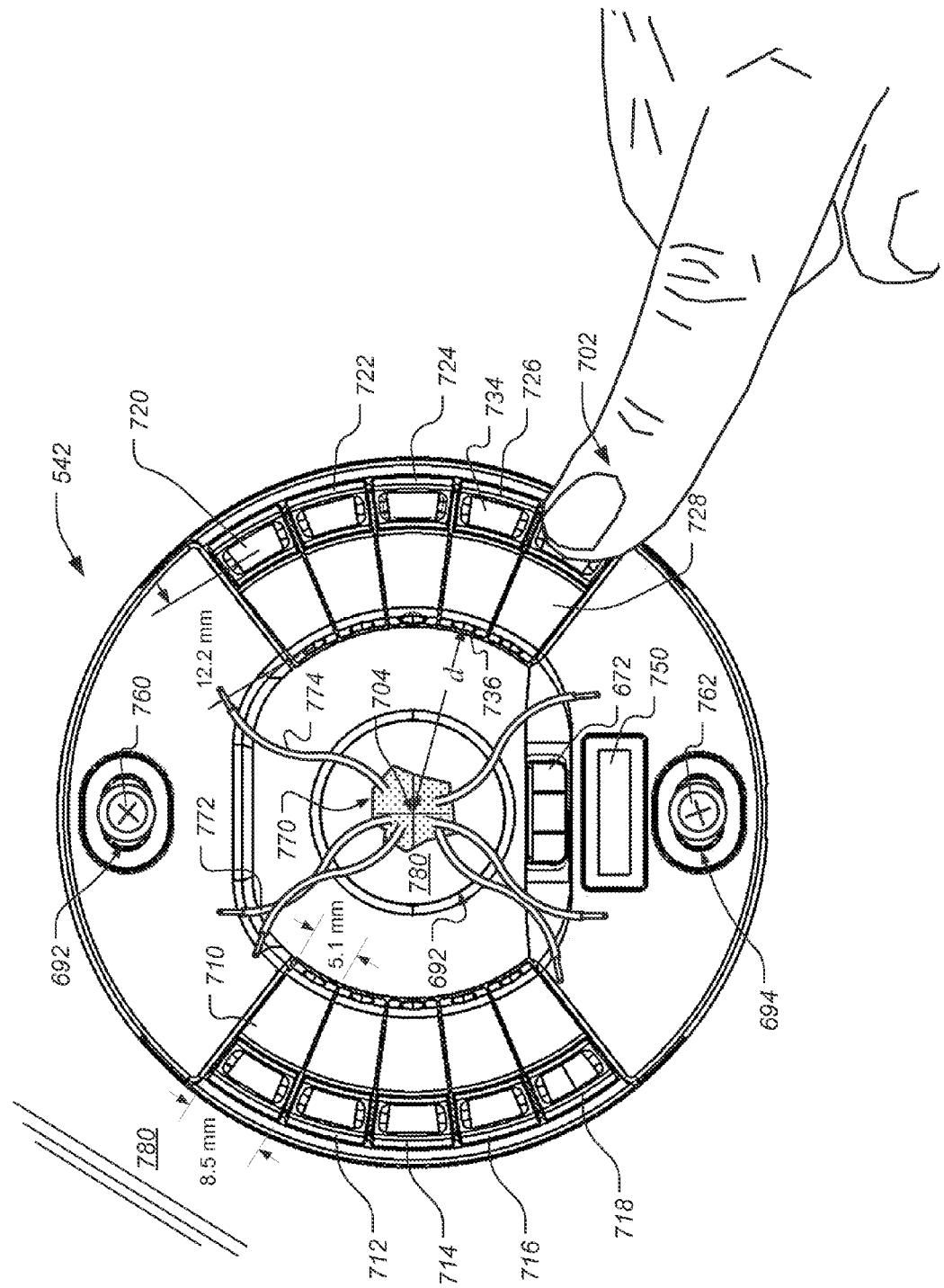

FIGS. 7A-7B are diagrams showing a thermostat backplate having a plurality of user-friendly tool-free wiring terminals, according to some embodiments. For ease of installation, the thermostat 102 is separable into a head unit 540 and backplate 542. Shown in FIG. 7A is a plan view of backplate 542 which has been configured for easy installation by a non-expert installer, such as an end-user. Back plate 542 includes two banks of HVAC wire connectors, which together provide capability for tool-free connection to up to 10 HVAC system wires. A semi-circularly arranged left bank includes 5 connectors 710, 712, 714, 716 and 718. Likewise, a semi-circularly arranged right bank includes 5 connectors 720, 722, 724, 726 and 728. Although 10 wiring connectors are shown in the embodiments of FIG. 7A, other numbers of connectors (for example 6, 8 or 12 connectors) can be similarly arranged in banks of circular arrangements. A large central opening 692 is provided through which the HVAC wires can pass when backplate 542 is wall mounted. As shown in FIG. 7A, the backplate is mounted using two screw fasteners 760 and 762 passing through backplate mounting holes 692 and 694 respectively and anchored into wall 780. A number of HVAC system wires, for example wires 772 and 774 are shown protruding through wall hole 770 and through backplate central opening 692. By arranging the connectors along an arc close to the outer periphery of the backplate 542, a relatively large number of wiring connectors can be accommodated, with each individual connector still being large enough to allow for ease of making electrical connection with HVAC wires by a non-expert without the use of tools. In particular, each wiring connector has a spring loaded, pushable button which allows for an HVAC wire to be inserted into a wire hole. For example, connector 726 has a spring loaded button 734 and a wire hole 736. When the button is released, the spring action within the connectors a wire securely grasps the wire inserted in the wire hole. Each connector is wedge shaped as shown, with the button end being wider than the wire-hole end. In the examples shown, the button end of the connector is 8.5 mm in width and the wire-hole end is 5.1 mm in width. In the embodiment shown, each connector occupies 15.3 degrees of an arc on the backplate 542, however, it has been found that connector widths of between 10-20 degrees of arc to be suitable for many applications. Another important dimension from a usability standpoint has been found to be the distance from the button surface to the wire insertion location (the wire hole). If the button to wire-hole distance is too short, it has been found that many users have difficulty in installation because the finger used to press the button tends to block a good view of the wire hole. In the embodiments shown the distance from the button center to the wire hole is 12.2 mm.

By arranging the buttons in an arc-shaped pattern close to the outer periphery of backplate 542, and by shaping each connecter in a wedge-like shape, the surface area of the buttons can be maximized since there is more room for each button when the connectors are shaped and arranged as shown. Additionally, it has been found that it is easier for many users to press a button that is very close to the periphery of a backplate device, especially located close to the left and right edges when wall-mounting a thermostat. HVAC system wires, such as wires 772 and 774 are commonly 18 gauge solid (18 AWG or 1.024 mm diameter). As a result the wires protruding from the hole in the wall are rather stiff and may be difficult to bend and otherwise manipulate. By passing the HVAC wires through a central opening 692 and arranging the connectors close to the outer periphery of backplate 542 and positioning the wire holes in an arc-shaped pattern surrounding the central opening, more space is allowed the user to bend the HVAC wires. The distance d from the center 704 of the central opening 692 (and of the backplate 542) to the wire hole in each connector is 21 mm. Also, since the wire holes are arranged in a circular pattern around the central opening 692, the distance d from the wire hole to the center of the backplate is equal for each connector, thereby aiding the installation of many wires being the same length protruding from wall 780 from the same hole 770. The radial direction between the hole 770 and the wire holes of the conductors also allows for few and less complicated bending of the HVAC wires during installation, since each hole is directly facing the hole 770. Thus, for many reasons, the placement, shape orientation and arrangement of the connectors on the backplate 542 has been found to greatly increase the user install ability of the thermostat. An example of user's finger 702 is shown pressing the button of connector 728.

FIG. 7B is a perspective view of a backplate being installed on a wall, according to some embodiments. The backplate 542 is shown attached to surface of wall 780. The user has a left hand 704 that is pressing the button of connector 716 while a right hand 706 is inserting a wire 750 into the wire hole 746 of wiring connector 716. Note that due to the adequate distance between the button and wire hole of the connector, the user's finger used to press the button does not block the user's view of the wire hole. It has been found that the combination of pressing a spring loaded button and inserting the wire in a wire hole is much easier for non-expert installers than conventional screw-type wire terminals which require carefully holding a wire in place while positioning and turning a relatively small sized screw driver.

For one embodiment, the backplate of the thermostat can be equipped with a small mechanical detection switch (not shown) for each distinct input port, such that the insertion of a wire (and, of course, the non-insertion of a wire) is automatically detected and a corresponding indication signal is provided to a processing system of the thermostat upon initial docking. In this way, the thermostat can have knowledge for each individual input port whether a wire has, or has not, been inserted into that port. Preferably, the thermostat can be also provided with electrical sensors (e.g., voltmeter, ammeter, and ohmmeter) corresponding to each of the input wiring connectors. The thermostat can thereby be enabled, by suitable programming, to perform some fundamental "sanity checks" at initial installation. By way of example, if there is no input wire at either the Rc or Rh terminal, or if there is no AC voltage sensed at either of these terminals, further initialization activity can be immediately halted, and the user notified on the user interface, because there is either no power at all or the user has inserted the Rc and/or Rh wires into the wrong terminal. By way of further example, if there is a live voltage on the order of 24 VAC detected at any of the W, Y, and G terminals, then it can be concluded that the user has placed the Rc and/or Rh wire in the wrong place. Throughout the remainder of this disclosure, these capabilities will be referred to separately as "mechanical detection" and "electrical detection."

In some embodiments, it has been found particularly useful for the thermostat itself to be self-contained such that a knowledge base of possible HVAC system configurations is stored within the thermostat. The user interface may provide wiring charts, scenario diagrams, interview-style questions, and so forth that have been preloaded on the thermostat in order to facilitate easy installation. This may provide a user with all of the instructions necessary for installation without requiring network activity to access a URL or website information. In other embodiments, the thermostat may instead be provided with wire insertion sensors using mechanical detection or electrical detection in combination with a communication chip and a user interface. In this case, the thermostat may provide wiring configuration information to the cloud server from which is retrieved possible HVAC system configurations. Although this embodiment may not be self-contained like the first embodiment, the cloud-based configuration database can be updated constantly at the cloud server.

In still other embodiments the thermostat need not require a user interface at all. Instead, the interface may be provided by a smart phone, PDA, or other mobile computing device. In this case, the user may interface with the thermostat using the mobile computing device. This may allow the cost of the thermostat to be greatly reduced as a user interface may be eliminated. Additionally, the power usage of the thermostat may be conserved by not requiring a user interface. Of course, the installation methods described herein for determining an HVAC system configuration may also operate using the mobile computing interface.

It will be understood in light of this disclosure that one having skill in the art could readily combine any of these methods for providing installation information. Namely, information may be stored a priori on the thermostat, provided by a cloud server, and or interfaced with a mobile computing device, depending on the particular embodiment and use thereof. However, it has been discovered that storing all or most of the information required for installation on the thermostat can be most advantageous because no network connection is required. This avoids a so-called "chicken and egg" problem, wherein users without network connections cannot access installation information, and they are unable to diagnose the problem because they have no network connection. This scenario causes many users to simply give up and return the thermostat in exchange for a more basic model that does not provide advanced functionality.

Figure 8:
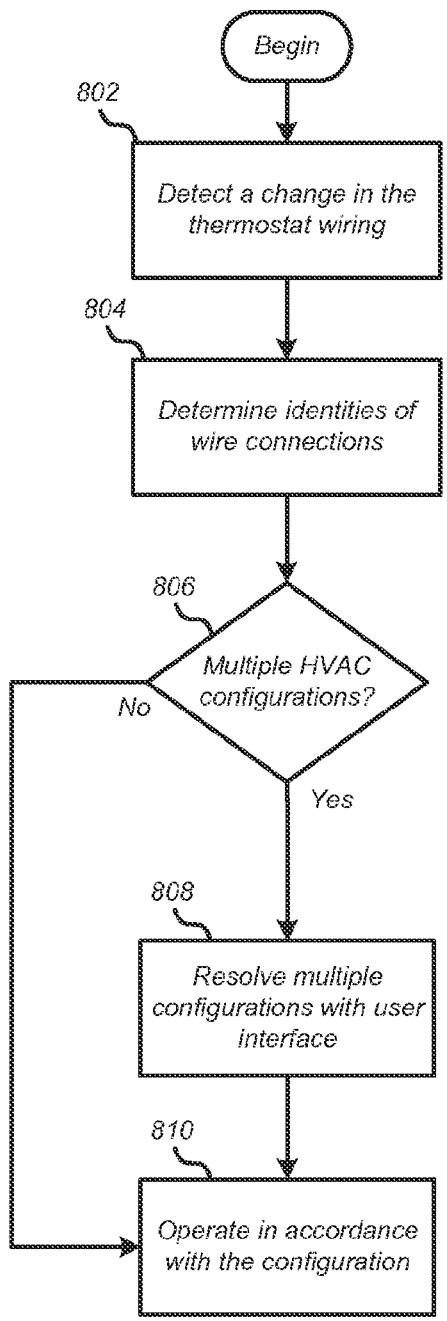
FIG. 8 illustrates a flowchart of a method for determining an HVAC configuration using wire connectors, according to one embodiment.

FIG. 8 illustrates a flowchart 800 of a method for determining an HVAC configuration using wire connectors, according to one embodiment. The method may include detecting a change in the thermostat wiring (802). The change may be detected using mechanical detection techniques and/or electrical detection techniques as described above. In one embodiment, a delay may be added such that these changes are not detected until after a batch of changes has been made, such as during installation process after the thermostat is assembled. This detection may also be carried out by a connection sensing module coupled to a plurality of HVAC connectors. The connection sensing module may be configured to determine the identities of a first subset of the plurality of HVAC connectors into which corresponding HVAC wires have been inserted.

The method may also include determining identities of the wire connectors (804). In one embodiment, this step may comprise a processing system that is configured to process the identities of the subset of HVAC connectors to determine a configuration of the HVAC system to be controlled.

The method may further include determining whether multiple HVAC system configurations are indicated by the connected wires (806). In one embodiment, this may be determined by identifying, based on the identities of the first subset of identified HVAC connectors, whether (i) only a single possible HVAC system configuration is indicated thereby, or (ii) multiple possible HVAC system configurations are indicated thereby.

If it is determined that only a single possible HVAC system configuration is indicated, then the method may include operating the HVAC system according to the single possible HVAC system configuration (810). Alternatively, if it is determined that multiple HVAC configurations are possible, the method may include resolving the multiple possible HVAC system configurations down to a particular one HVAC configuration (808). In one embodiment, the multiple HVAC system configurations may be resolved based on at least one user response to at least one inquiry to a user presented on a user interface. Examples of such user interfaces may be discussed further herein below. After the multiple HVAC system configurations have been resolved to a single HVAC configuration, the system may then operate in according to the particular HVAC system configuration (810).

It should be appreciated that the specific steps illustrated in FIG. 8 provide particular methods of determining an HVAC system configuration according to various embodiments of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

The method described above can be implemented using virtually any control unit for an enclosure. In the case of a thermostat, the method described above can be used to configure the thermostat to be compatible with virtually any HVAC system configuration. The particular thermostat described herein includes ten distinct HVAC wire connectors. However, it will be understood that other thermostat embodiments may include more or fewer HVAC wire connectors, which may have different names or labels associated with HVAC wires. Depending on which wires are available, and which wire connectors are used by the particular thermostat embodiment, different logical algorithms may be used to determine an HVAC configuration.

In order to provide an enabling disclosure, a description is provided below for one particular logical algorithm used in a preferred thermostat embodiment. In light of this disclosure, one having skill in the art can readily adapt the algorithm described below to be compatible with virtually any HVAC system configuration. This exemplary algorithm can be implemented using high or low level programming languages on a microcontroller or microprocessor in the thermostat embodiments. For example, the flowcharts and algorithms described below may be implemented, for example, using "switch" statements or a nested series of "if-then-else" control structures. It should be noted that the exact order of operations described below is merely exemplary, and not meant to be limiting. Alternate embodiments could vary both the order in which mechanical connections are tested and the logical pathways dependent on the results of detecting mechanical connections.

Figure 9:
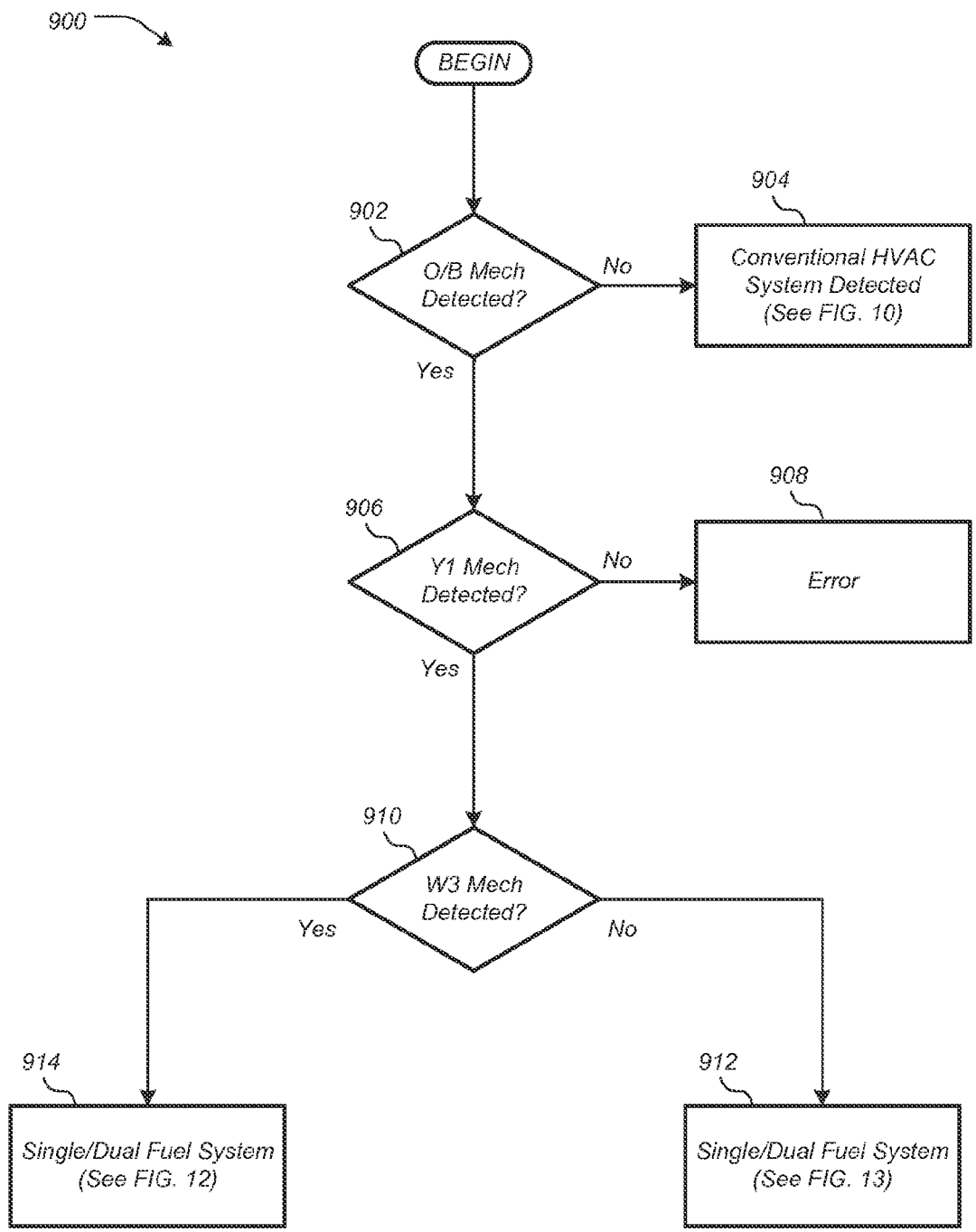
FIG. 9 illustrates a flowchart of a method of determining whether an HVAC system uses a heat pump, according to one embodiment.

FIG. 9 illustrates a flowchart 900 of a method of determining whether an HVAC system uses a heat pump, according to one embodiment. In this embodiment, it can first be determined whether a wire has been mechanically inserted into an O/B connector of the thermostat (902). The O/B wire can be used to control the direction of a heat pump, i.e. whether the heat pump is heating or cooling the inside of the enclosure. Generally, the O/B wire is not used in a conventional HVAC system. As used herein, the term "conventional" may be used to refer to any HVAC system that does not use a heat pump. Therefore, if a wire is not mechanically detected in the O/B connector, it can be reliably determined that the HVAC system uses a conventional heater and/or air conditioner (904). The discussion for conventional systems continues in relation to FIG. 10 described herein below.

Next, the method may determine whether a wire is mechanically detected at the Y1 connector (906). Generally, the Y1 wire is used to activate the heat pump. If no wire is detected at the Y1 connector, then this may result in an error condition (908). For example, a message can be displayed on the user interface informing the user that a Y1 wire is not detected, and the heat pump requires a Y1 wire. The user could also be referred to a website explaining the issue and providing more information. Refer to FIGS. 14-18 later in this disclosure for a discussion of addressing errors and/or ambiguities using the user interface of the thermostat.

If a wire is detected at the Y1 connector, it may next be determined whether a wire is mechanically detected at the W3 connector (910). At this point, the thermostat knows that it is dealing with a heat pump based HVAC system; however, many different heat pump configurations can exist. In this particular embodiment, the W3 wire can be used to segregate the various possible heat pump configurations into two categories. The first category of heat pump systems uses the W3 wire (914), and will be discussed in relation to FIG. 12 below. Similarly, the second category of heat pump system does not use the W3 wire (912), and will be discussed in relation to FIG. 13 below.

Figure 10:
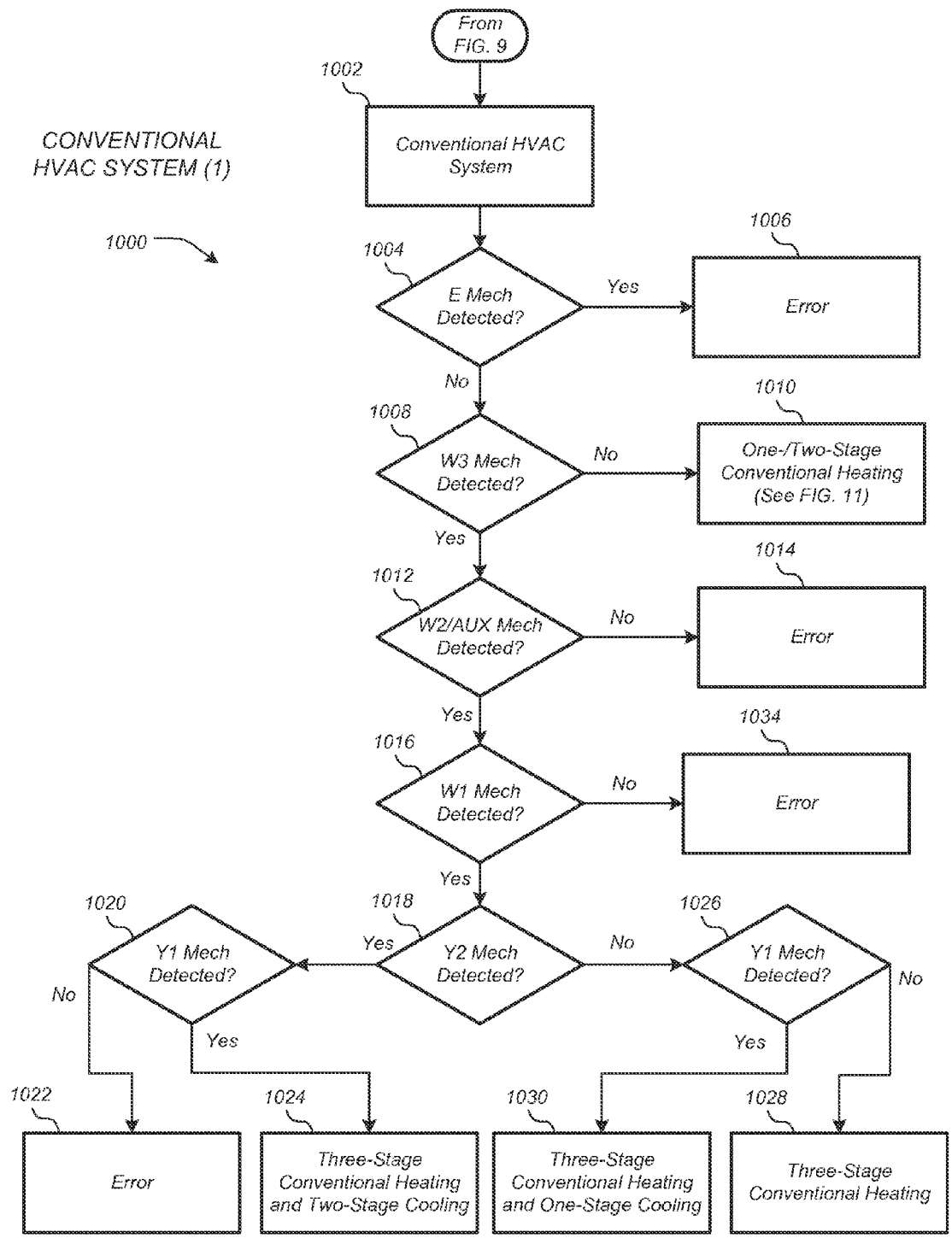
FIG. 10 illustrates a flowchart of a method for determining an HVAC system configuration for a conventional HVAC system, according to one embodiment.

FIG. 10 illustrates a flowchart 1000 of a method for determining an HVAC system configuration for a conventional HVAC system, according to one embodiment. Flowchart 1000 may be considered a continuation of flowchart 900 from FIG. 9. At this point, it may have already been established that a conventional HVAC system—rather than a heat pump—is connected to the thermostat because no O/B wire was connected (1002). Next, it can be determined whether a wire is mechanically detected at the E connector. If an E wire is detected, an error may be displayed on the user interface informing a user that the E wire should only be connected when an O/B wire is connected in a heat pump system (1006).

Next, it can be determined whether a wire is mechanically detected at the W3 connector (1008). If a W3 wire is not detected, then it may be possible to determine that a one-stage or a two-stage conventional heating unit is connected to the thermostat (1010). This option may be processed in accordance with the flowchart discussed below in relation to FIG. 11 below. If a W3 wire is mechanically detected, then it can next be determined whether a wire is mechanically detected at the W2/AUX connector (1012). If a W2/AUX wire is not detected, then an error may be displayed on a user interface explaining that a W3 wire also requires a W2/AUX wire (1014). Next, it can be determined whether a wire is mechanically detected at the W1 connector (1016). If a W1 wire is not detected, then an error may be displayed on the user interface that additional wires may be required because the W2/AUX wire has been detected by itself (1034).

Next, it can be determined whether a wire is mechanically detected at the Y2 connector (1018), as well as whether a wire is mechanically detected at the Y1 connector (1020, 1026). If a Y2 wire is connected but a Y1 wire is not connected, then an error may be displayed on a user interface informing a user that a Y2 wire requires a Y1 wire (1022). If both a Y1 wire and a Y2 wire are connected, then the thermostat may determine that a three-stage conventional heating with a two-stage conventional cooling HVAC system configuration is present (1024). If a Y1 wire is connected without a Y2 wire, then the thermostat may determine that a three-stage conventional heating and one-stage conventional cooling HVAC system configuration is present (1030). Finally, if it is determined that neither the Y1 wire nor the Y2 wire is connected, then it may be determined that a three-stage conventional heating HVAC system configuration is present (1028).

Figure 11:
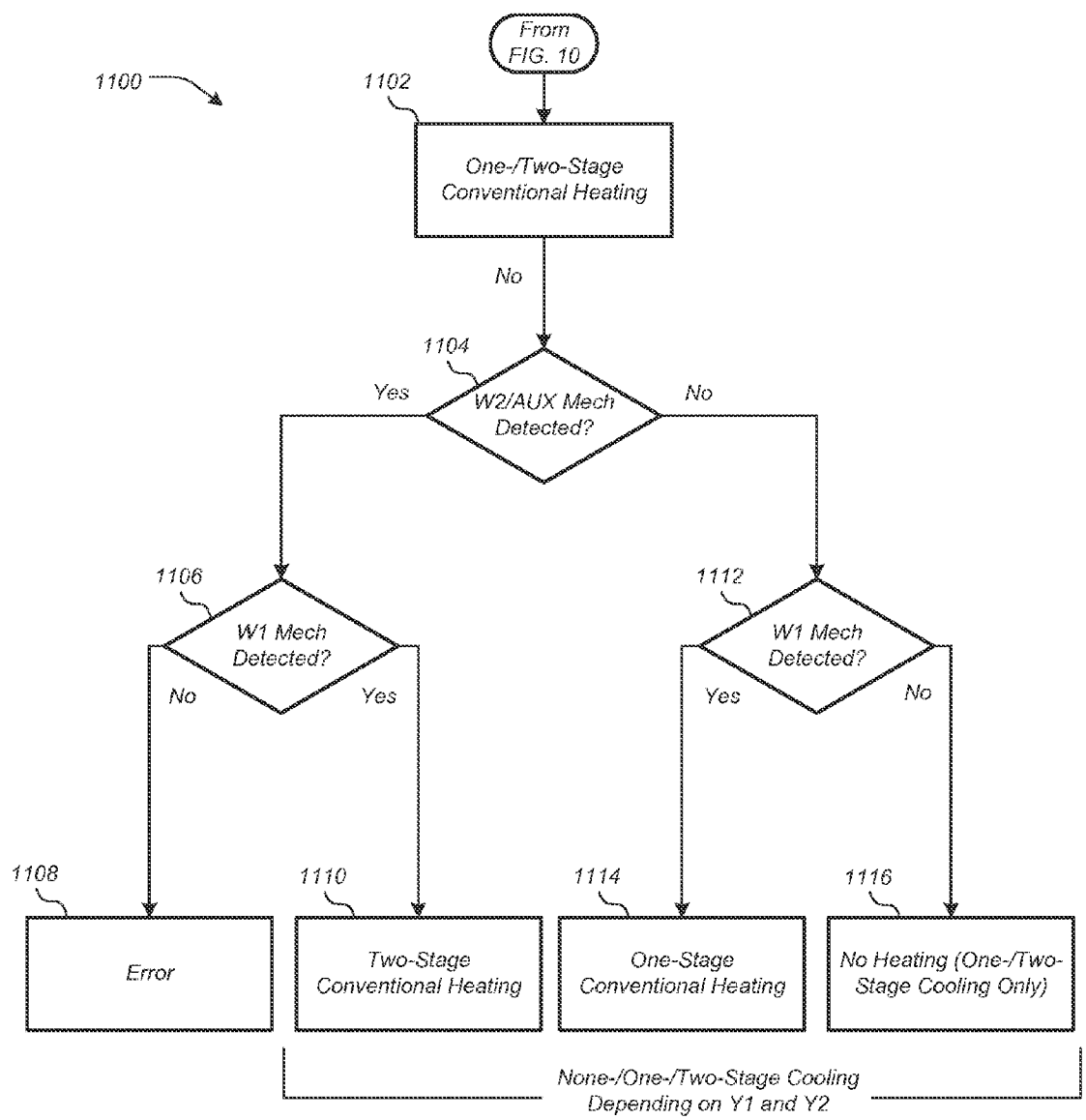
FIG. 11 illustrates a flowchart of a method for determining an HVAC system configuration for one-stage or two-stage conventional heating, according to one embodiment.

One-stage or two-stage conventional heating systems can be detected by continuing on from flowchart 1000 at step 1010. FIG. 11 illustrates a flowchart 1100 of a method for determining an HVAC system configuration for one-stage or two-stage conventional heating, according to one embodiment. As previously detected, based on the absence of a wire in the W3 connector, it may be determined a one-stage or two-stage conventional heating HVAC system configuration may be present (1102).

Next, it may be determined whether a wire is mechanically detected at the W2/AUX connector of the thermostat (1104), as well as whether a wire is mechanically detected at the W1 connector of the thermostat (1106, 1112). If a W2/AUX wire is detected without a W1 wire, then an error may be displayed on the user interface that additional wires may be required because the W2/AUX wire has been detected by itself (1108). If a W2/AUX wire and a W1 wire are both detected, then a two-stage conventional heating system may be determined to be present (1110). Depending on the presence of the Y1 and Y2 wires, either a one-stage or a two-stage cooling system may also be present. If no W2/AUX wire is connected, but a W1 wire is connected, then an error may be present. Again, depending on the presence of the Y1 and Y2 wires, either a one-stage or a two-stage cooling system may also be present. Finally, if neither a W2/AUX wire or a W1 wire are connected, then depending upon the presence of the Y1 and Y2 wires, either a one-stage or a two-stage cooling system may be present without a heating system.

Figure 12:
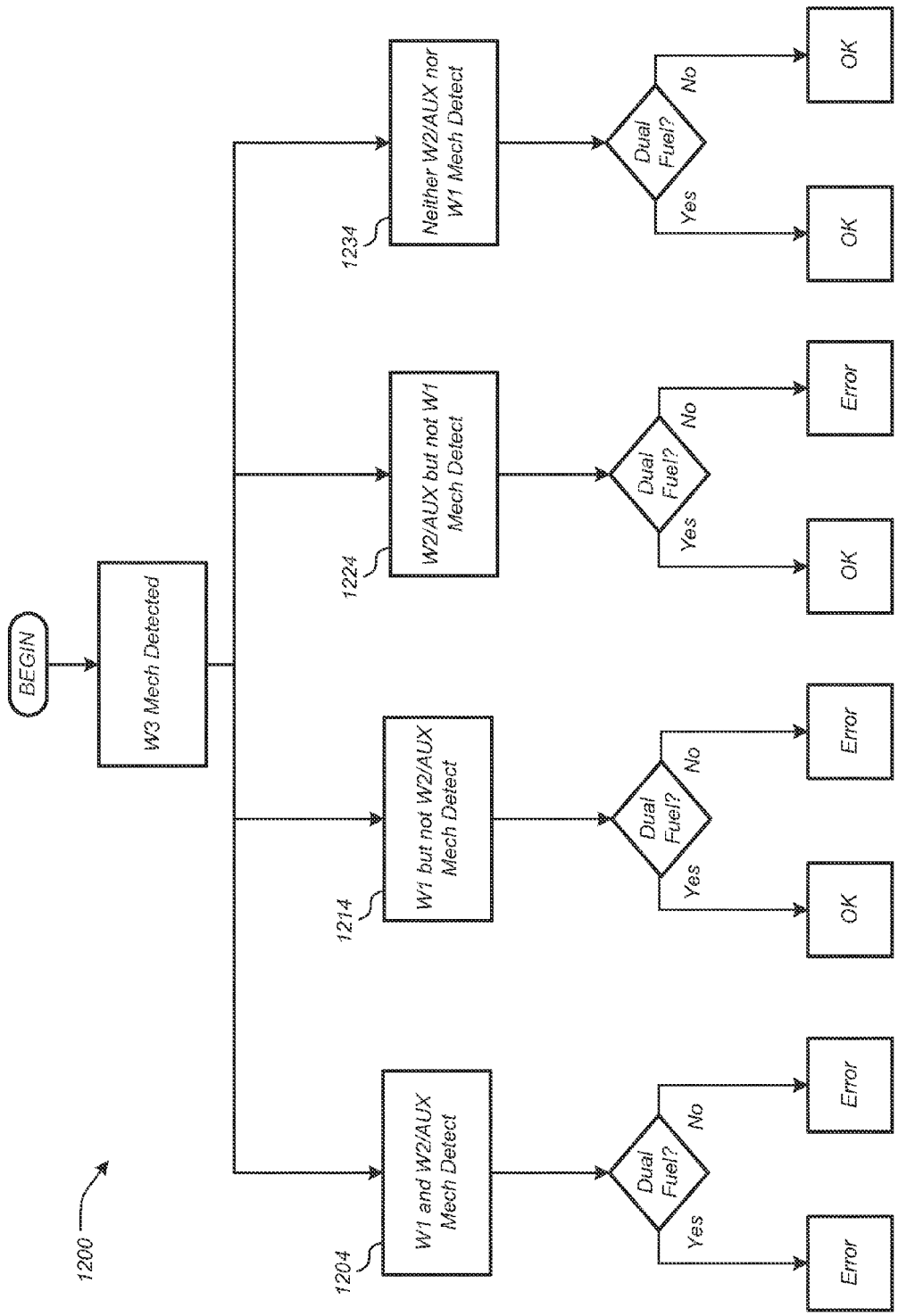
FIG. 12 illustrates a flowchart of a method for determining an HVAC system configuration for a heat pump system with a W3 wire connection, according to one embodiment.

Turning back briefly to FIG. 9, if an O/B wire was mechanically detected, then a heat pump system was determined to be connected to the thermostat. Assuming that a connection was also made to the Y1 connector, it could be assumed that either a single-fuel system or a dual-fuel system configuration was present. FIG. 12 illustrates a flowchart 1200 of a method for determining an HVAC system configuration for a heat pump system with the W3 wire connection (continuing from step 914 of FIG. 9), according to one embodiment. After detecting the W3 wire, it may next be determined whether connections are made to the W2/AUX connector and/or the W1 connector (1204, 1214, 1224, 1234).

The next step in the method can be modified to include inputs other than mechanical wire connections. In this particular embodiment, a user interface may be configured to present a user with an interview-style question(s) to determine whether the heat pump is single-fuel or dual-fuel. Depending upon one or more inputs provided to the user interface in response to the interview style question(s), the thermostat may then determine whether a final HVAC system configuration can be determined, or whether an error message should be presented on the user interface.

Figure 13:
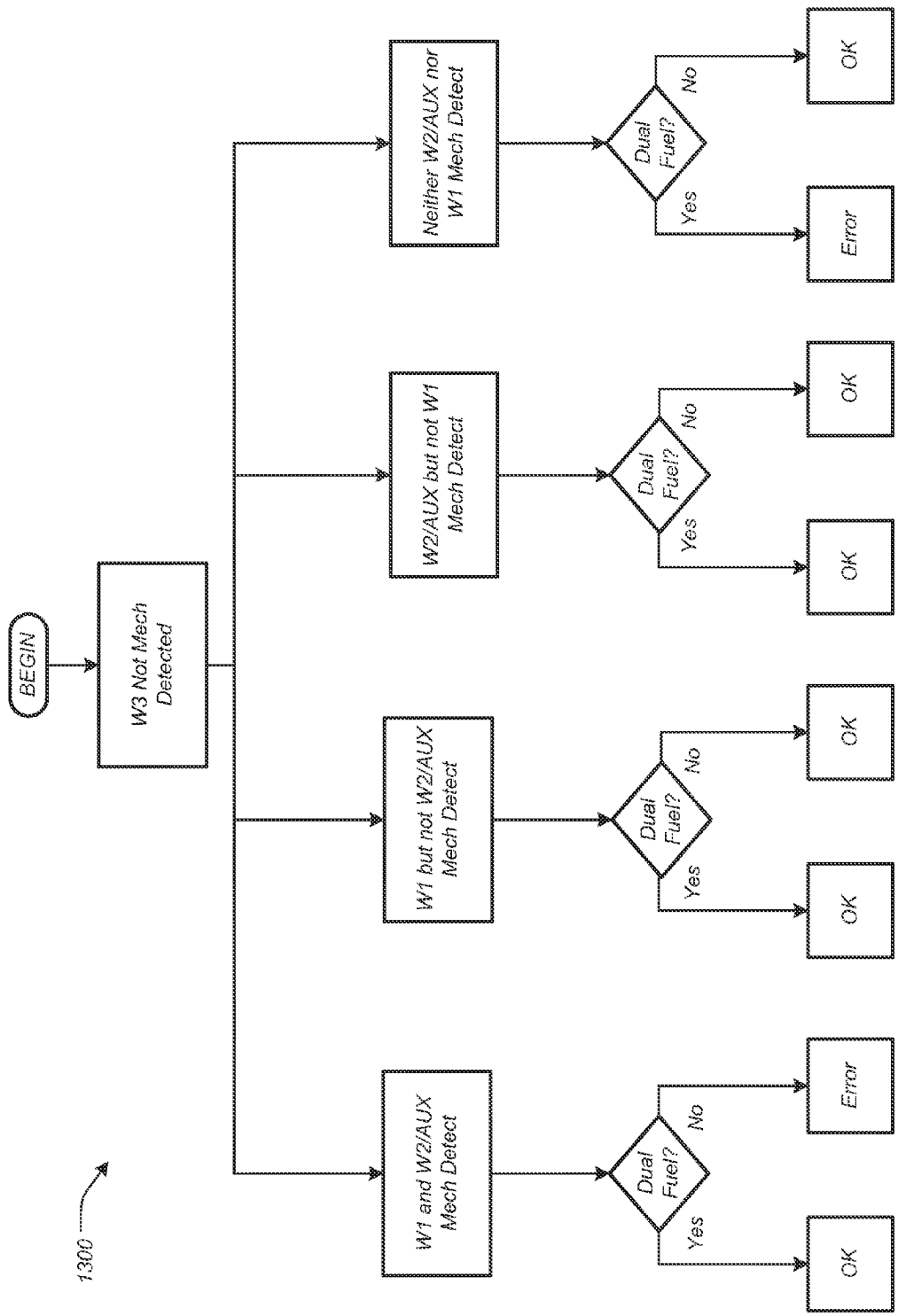
FIG. 13 illustrates a flowchart of a method for determining an HVAC system configuration for a heat pump system without the W3 wire connection, according to one embodiment.

Similarly, FIG. 13 illustrates a flowchart 1300 of a method for determining an HVAC system configuration for a heat pump system without the W3 wire connection (continuing from step 912 of FIG. 9), according to one embodiment. Again, a user interface may be configured to present a user with an interview-style question(s) to determine whether the heat pump is single-fuel or dual-fuel. Depending upon one or more inputs provided to the user interface in response to the interview style question(s), the thermostat may then determine whether a final HVAC system configuration can be determined, or whether an error message should be presented on the user interface.

It will be understood that numerous details and decisions may have been omitted from the flowcharts illustrated in FIGS. 9-13 for brevity. For example, instead of illustrating final HVAC system configurations in flowchart 1200, an indication of whether a final system configuration could be determined was presented. One having skill in the art could use the flowcharts and discussion included herein to readily fill in the remaining details. For convenience and to provide an enabling disclosure, listed below is an exemplary pseudocode implementation of these flowcharts that may be implemented by any digital or analog computing or processing system. Of course, many other specific implementations would be readily understood in light of this disclosure, and this example could be edited or altered depending on the particular embodiment, location, and/or HVAC system.

HVAC Control Wire Check [O/B, W1, W2/AUX, W3, Y1, Y2, E]

a. O/B detected mechanically
  i. Y1 not detected mechanically [Error]
  ii. Y1 detected mechanically
    1. W3 detected mechanically
      a. W1 and W2/AUX detected mechanically
        i. Dual fuel selected [Error]
          1. O/B, Y1, W3, W1, W2/AUX [one-stage heat pump heating and cooling with three-stage conventional heating]
          2. O/B, Y1, W3, W1, W2/AUX, Y2 [two-stage heat pump heating and cooling with three-stage conventional heating]
        ii. Dual fuel not selected [Error]
          1. O/B, Y1, W3, W1, W2/AUX [one-stage heat pump heating and cooling with three-stage electric strip heating]
          2. O/B, Y1, W3, W1, W2/AUX, Y2 [two-stage heat pump heating and cooling with three-stage electric strip heating]
      b. W1 detected mechanically but W2/AUX not detected mechanically
        i. Dual fuel selected [OK]
          1. O/B, Y1, W3, W1 [one-stage heat pump heating and cooling with two-stage conventional heating]
          2. O/B, Y1, W3, W1, Y2 [two-stage heat pump heating and cooling with two-stage conventional heating]
        ii. Dual fuel not selected [Error]
          1. O/B, Y1, W3, W1 [one-stage heat pump heating and cooling with two-stage electric strip heating]
          2. O/B, Y1, W3, W1, Y2 [two-stage heat pump heating and cooling with two-stage electric strip heating]
      c. W2/AUX detected mechanically but W1 not detected mechanically
        i. Dual fuel selected [OK]
          1. O/B, Y1, W3, W2/AUX [one-stage heat pump heating and cooling with two-stage conventional heating]
          2. O/B, Y1, W3, W2/AUX, Y2 [two-stage heat pump heating and cooling with two-stage conventional heating]
        ii. Dual fuel not selected [Error]
          1. O/B, Y1, W3, W2/AUX [one-stage heat pump heating and cooling with two-stage electric strip heating]
          2. O/B, Y1, W3, W2/AUX, Y2 [two-stage heat pump heating and cooling with two-stage electric strip heating]
      d. Neither W1 nor W2/AUX detected mechanically
        i. Dual fuel selected [OK]
          1. O/B, Y1, W3 [one-stage heat pump heating and cooling with one-stage conventional heating]
          2. O/B, Y1, W3, Y2 [two-stage heat pump heating and cooling with one-stage conventional heating]
        ii. Dual fuel not selected [OK]
          1. O/B, Y1, W3 [one-stage heat pump heating and cooling with one-stage electric strip heating]
          2. O/B, Y1, W3, Y2 [two-stage heat pump heating and cooling with one-stage electric strip heating]
    2. W3 not detected mechanically
      a. W1 and W2/AUX detected mechanically
        i. Dual fuel selected [OK]
          1. O/B, Y1, W1, W2/AUX [one-stage heat pump heating and cooling with two-stage conventional heating]
          2. O/B, Y1, W1, W2/AUX, Y2 [two-stage heat pump heating and cooling with two-stage conventional heating]
          3. O/B, Y1, W1, W2/AUX, E [one-stage heat pump heating and cooling with two-stage conventional heating and emergency heating]
          4. O/B, Y1, W1, W2/AUX, Y2, E [two-stage heat pump heating and cooling with two-stage conventional heating and emergency heating]
        ii. Dual fuel not selected [Error]
          1. O/B, Y1, W1, W2/AUX [one-stage heat pump heating and cooling with two-stage electric strip heating]
          2. O/B, Y1, W1, W2/AUX, Y2 [two-stage heat pump heating and cooling with two-stage electric strip heating]
3. O/B, Y1, W1, W2/AUX, E [one-stage heat pump heating and cooling with two-stage electric strip heating and emergency heating]
4. O/B, Y1, W1, W2/AUX, Y2, E [two-stage heat pump heating and cooling with two-stage electric strip heating and emergency heating]
b. W1 detected mechanically but W2/AUX not detected mechanically
i. Dual fuel selected [OK]
1. O/B, Y1, W1 [one-stage heat pump heating and cooling with one-stage electric strip heating]
2. O/B, Y1, W1, Y2 [two-stage heat pump heating and cooling with one-stage electric strip heating]
3. O/B, Y1, W1, E [one-stage heat pump heating and cooling with one-stage electric strip heating and emergency heating]
4. O/B, Y1, W1, Y2, E [two-stage heat pump heating and cooling with one-stage electric strip heating emergency heating]
ii. Dual fuel not selected [OK]
1. O/B, Y1, W1 [one-stage heat pump heating and cooling with 1. one-stage conventional heating]
2. O/B, Y1, W1, Y2 [two-stage heat pump heating and cooling with one-stage conventional heating]
3. O/B, Y1, W1, E [one-stage heat pump heating and cooling with one-stage conventional heating and emergency heating]
4. O/B, Y1, W1, Y2, E [two-stage heat pump heating and cooling with one-stage conventional heating emergency heating]
c. W2/AUX detected mechanically but W1 not detected mechanically
i. Dual fuel selected [OK]
1. O/B, Y1, W2/AUX [one-stage heat pump heating and cooling with one-stage electric strip heating]
2. O/B, Y1, W2/AUX, Y2 [two-stage heat pump heating and cooling with one-stage electric strip heating]
3. O/B, Y1, W2/AUX, E [one-stage heat pump heating and cooling with one-stage electric strip heating and emergency heating]
4. O/B, Y1, W2/AUX, Y2, E [two-heat heat pump heating and cooling with one-stage electric strip heating emergency heating]
ii. Dual fuel not selected [OK]
1. O/B, Y1, W2/AUX [one-stage heat pump heating and cooling with one-stage conventional heating]
2. O/B, Y1, W2/AUX, Y2 [two-stage heat pump heating and cooling with one-stage conventional heating]
3. O/B, Y1, W2/AUX, E [one-stage heat pump heating and cooling with one-stage conventional heating and emergency heating]
4. O/B, Y1, W2/AUX, Y2, E [two-stage heat pump heating and cooling with one-stage conventional heating emergency heating]
d. Neither W1 nor W2/AUX detected mechanically
i. Dual fuel selected [Error]
1. O/B, Y1 [one-stage heat pump heating and cooling (but no conventional 1. heating)]
2. 2. O/B, Y1, Y2 heat pump heating and cooling (but no conventional heating)]
3. O/B, Y1, E [one-stage heat pump heating and cooling with emergency heating (but no conventional heating)]
4. O/B, Y1, Y2, E [two-stage heat pump heating and cooling with emergency heating (but no conventional heating)]
ii. Dual fuel not selected [OK]
1. O/B, Y1 [one-stage heat pump heating and cooling]
2. O/B, Y1, Y2 [two-stage heat pump heating and cooling]
3. O/B, Y1, E [one-stage heat pump heating and cooling with emergency heating]
4. O/B, Y1, Y2, E [two-stage heat pump heating and cooling and emergency heating]
b. O/B not detected mechanically
i. E detected mechanically [Error]
ii. E not detected mechanically
1. W3 detected mechanically
a. W2/AUX not detected mechanically [Error]
b. W2/AUX detected mechanically
i. W1 not detected mechanically [Error]
ii. W1 detected mechanically
1. Y2 detected mechanically
a. Y1 not detected mechanically [Error]
b. Y1 detected mechanically [OK]
i. W3, W2/AUX, W1, Y2, Y1 [three-stage conventional heating and two-stage cooling]
2. Y2 not detected mechanically [OK]
a. W3, W2/AUX, W1 [three-stage conventional heating]
b. W3, W2/AUX, W1, Y1 [three-stage conventional heating and one-stage cooling]
2. W3 not detected mechanically
a. W2/AUX detected mechanically
i. W1 not detected mechanically [Error]
ii. W1 detected mechanically
1. Y2 detected mechanically
a. Y1 not detected a. mechanically [Error]
b. Y1 detected mechanically [OK]
i. W2/AUX, W1, Y2, Y1 [two-stage conventional heating and two-stage cooling]
2. Y2 not detected mechanically [OK]
a. W2/AUX, W1 [two-stage conventional heating]
b. W2/AUX, W1, Y1 [two-stage conventional heating and one-stage cooling]
b. W2/AUX not detected mechanically
i. W1 detected mechanically
1. Y2 detected mechanically
a. Y1 not detected mechanically [Error]
b. Y1 detected mechanically [OK]
i. W1, Y2, Y1 [one-stage conventional heating and two-stage cooling]
2. Y2 not detected mechanically [OK]
a. W1 [one-stage heating]
b. W1, Y1 [one-stage heating and one-stage cooling]
ii. W1 not detected mechanically
1. Y1 not detected mechanically [Error]
2. Y1 detected mechanically [OK]
a. Y1 [one-stage cooling]
b. Y1, Y2 [two-stage cooling]

User Interface

During the process of determining whether an HVAC system configuration can be determined, the thermostat may ascertain that the wires mechanically connected to the wiring connectors form an invalid combination that is not supported by the thermostat. In these cases, a user interface of the thermostat may be used to provide an output. The output may indicate that there is an error with the wiring configuration. The output may also indicate possible solutions for the error, the severity of the error, external references that may be consulted to solve the error, and/or possible effects of the error.

Figure 14A:
FIG. 14A illustrates a user interface of a thermostat for providing an output describing a wiring error, according to one embodiment.

FIG. 14A illustrates a user interface of a thermostat for providing an output describing a wiring error, according to one embodiment. Here, a user may have previously made wire connections to the wire connectors of the thermostat before turning the thermostat on. The thermostat may run through a hardware or software implementation of the logic and flowcharts described elsewhere herein to determine whether an HVAC system configuration can be determined. In this example, a wire may be mechanically detected at the Rc connector. The thermostat may determine that at least a Y1 or a W1 wire is necessary to run a valid HVAC system. In response, a wiring report 1402 may be presented on the user interface. The wiring report 1402 may include an error code 1404 as well as a message 1406 providing additional information about the error condition. For example, the message 1406 may explain that no heating or cooling wires were detected, and that at least a Y1 or a W1 wire is required. Additionally, the wiring report 1402 may include a reference 1408 to an external data source where more information regarding the error condition may be found, such as a website.

Figure 14B:
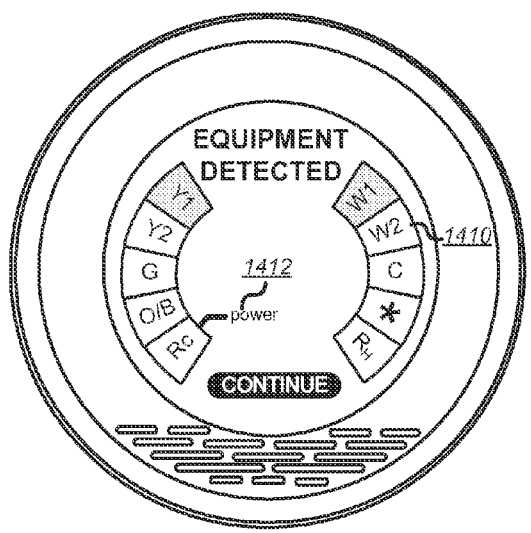
FIG. 14B illustrates a user interface of a thermostat providing a graphical output of mechanical wiring connections that have been detected, according to one embodiment.

Often, users may be installing their new thermostat by themselves without the aid or advice of a professional HVAC installer. Therefore, additional information may be provided on the user interface in order to simplify the installation process. For example, pictures of the wiring condition may be provided to the user along with graphical representations and/or animations that illustrate how the error may be diagnosed and/or solved. FIG. 14B illustrates a user interface of a thermostat providing a graphical output of mechanical wiring connections that have been detected, according to one embodiment. Here, each of a plurality of HVAC wire connectors 1410 may be illustrated for user. For example, the plurality of HVAC wire connectors 1410 may be arranged graphically on the user interface to match the actual physical arrangement provided by the thermostat. Notice that the plurality of HVAC connectors 1410 displayed by the user interface are arranged similarly to the physical arrangement shown in FIG. 7A. In this case, the connectors are arranged radially along the perimeter of the thermostat. In other embodiments, they may be arranged in a grid pattern, and oval pattern, or any other arrangement.

The user interface can show an electrical connection made for each of the plurality of HVAC wire connectors 1410. For example, electrical connection 1412 made to the Rc wire connector shows that a power wire has been electrically sensed at the connector. Furthermore, the wire connectors that are implicated by the error may also be highlighted. For example, the Y1 and the W1 connectors may have a different color, outline, or other such indicator arranged to draw a user's attention to those connectors. In this embodiment, a color or shading of the connectors implicated by the error has been altered compared to the connectors not responsible for or related to the error in the graphic display.

Figure 15A:
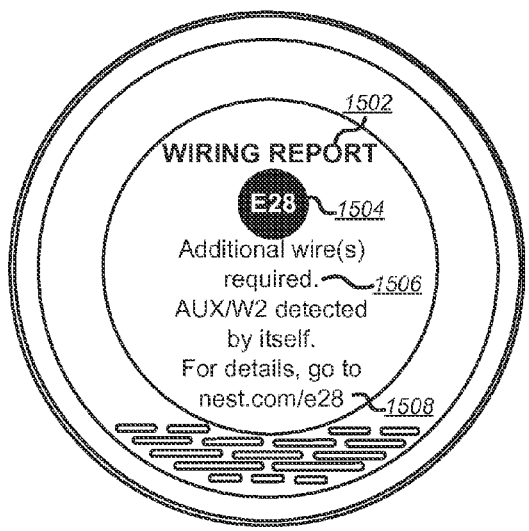
FIG. 15A illustrates a user interface of a thermostat providing a graphical output of multiple wiring connections, according to one embodiment.

These types of informative and instructive user interfaces may become even more important as the wiring configurations become more complex. FIG. 15A illustrates a user interface of a thermostat providing a graphical output of multiple wiring connections, according to one embodiment. As before, a wiring report 1502, an error code 1504, a message 1506, and a reference 1508 may be provided by the user interface. In this case, the message 1506 may inform a user that additional wires are connected in addition to the AUX/W2 wire. This may correspond to a case similar to that of step 1034 of FIG. 10, where a conventional HVAC system is detected with an AUX/W2 connection without a W1 connection.

Figure 15B:
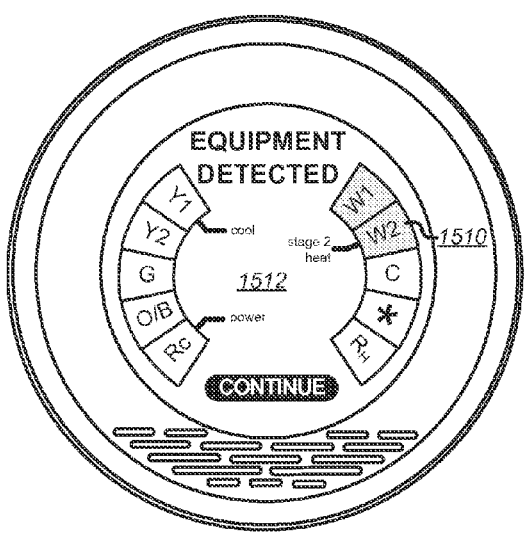
FIG. 15B illustrates a corresponding user interface of a thermostat providing a graphical wiring diagram, according to one embodiment.

FIG. 15B illustrates a corresponding user interface of a thermostat providing a graphical wiring diagram, according to one embodiment. Here, the plurality of HVAC wire connectors 1510 may show connections 1512 that have been mechanically detected. Here, valid connections have been made to the Y1 connector, the Rc connector, and the W2/AUX connector. Additionally, the graphical representation of the W1 connector may be highlighted such that the user may match the graphical representation to the actual HVAC connector layout and remedy the error by making the proper connection.

Figure 16A:
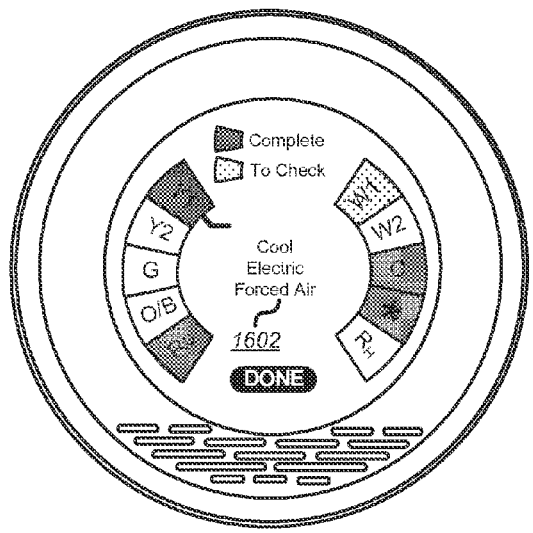
FIG. 16A illustrates a user interface of a thermostat providing a graphical description of a current wiring configuration, according to one embodiment.

In addition to providing information related to installation and wiring errors, the user interface may also be configured to provide valid configuration information to the user. FIG. 16A illustrates a user interface of a thermostat providing a graphical description of a current wiring configuration, according to one embodiment. In this embodiment, each wire at which a mechanical connection is detected may be selected using the user interface in order to bring up additional information related to that connection. For instance, the user interface may allow a user to cycle through each connection and verify that it is being interpreted correctly by the thermostat. Each connection may be color-coded or otherwise highlighted to show users connections that have been checked and connections that still need to be checked.

In this example, a message 1602 may be displayed for each connection describing how the thermostat is interpreting the connection. For instance, the Y1 connection may be interpreted by the thermostat to control an electric air conditioner using forced air. If a user determines that this is an incorrect interpretation of the wiring connection, the user may select the Y1 connection using the user interface and navigate to a screen providing interactive options for changing the way the Y1 connection is interpreted.

Figure 16B:
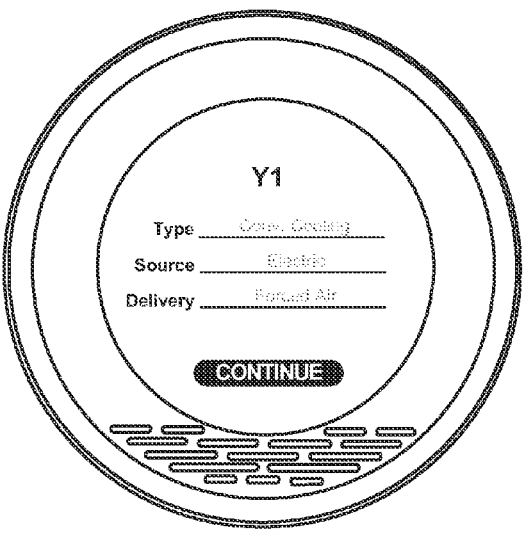
FIG. 16B illustrates a thermostat user interface providing additional information for a particular connector, according to one embodiment.

FIG. 16B illustrates a thermostat user interface providing additional information for a particular connector, according to one embodiment. If a user selects the Y1 connection in the previous interface, the interface of FIG. 16B may show that the thermostat will operate according to the displayed characteristics of the Y1 wire. Assuming that no O/B wire is connected, the Y1 wire may be construed to operate a conventional cooling system. The source may be electrical, and the cooling system may operate with a forced air delivery. In some cases where multiple options are available, a user may select either the source, type, or delivery associated with the Y1 wire and choose a different option from a menu that may be displayed on the user interface.

The user interface may also be adaptable such that it can handle many different types of HVAC system configurations. Some HVAC systems may include additional wires that are not specifically labeled on the HVAC connectors of the thermostat. Additional features such as radiant floor heating, humidifiers, dehumidifiers, emergency heating systems, second stages for heating and cooling systems, and/or the like may be numerous, and thus it would be impractical to provide a dedicated wire connector for each option that may be rarely used. In order to handle these various additional options, certain embodiments described herein will include a wildcard connector labeled with, for example, an asterisk or a star. The thermostat function associated with this connector may be configured by a user using the user interface to handle one of the many various optional HVAC features that may be available.

Figure 17A:
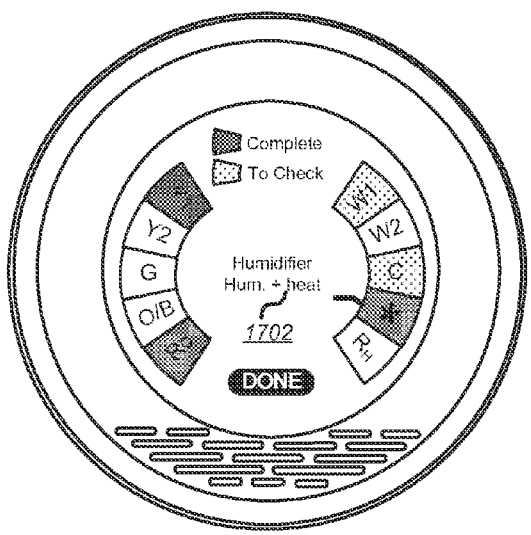
FIG. 17A illustrates a thermostat with a user interface displaying a connection to a wildcard connector, according to one embodiment.

FIG. 17A illustrates a thermostat with a user interface displaying a connection to the wildcard connector, according to one embodiment. In this embodiment, the user interface may display a currently selected function 1702 when the wildcard connector is selected. In this case, the wildcard connector is configured to operate a bypass humidifier (i.e. a humidifier that requires concurrent heat). In this particular embodiment, the functions associated with the wildcard connector are displayed as part of a check routine for each connector. Generally, if a wire is connected to the wildcard connector, the thermostat may provide a graphical display similar to that of FIG. 17A such that the user can configure the function of the wildcard connector before the thermostat begins operating. This may take place during an installation routine.

Figure 17B:
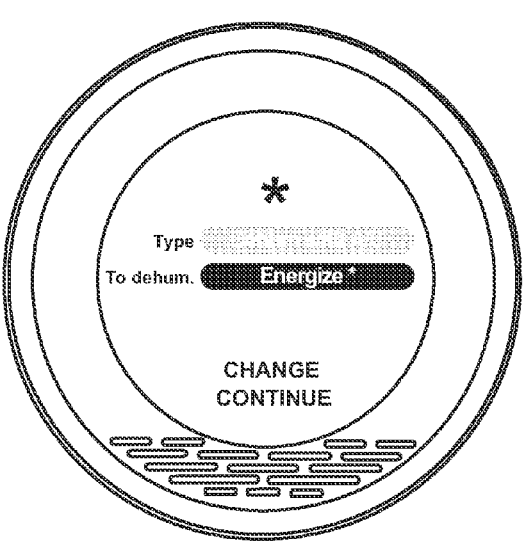
FIG. 17B illustrates a thermostat with a user interface displaying a configuration screen for the wildcard connector, according to one embodiment.

FIG. 17B illustrates a thermostat with a user interface displaying a configuration screen for the wildcard connector, according to one embodiment. In this case, the user interface may be used to change the function of the wildcard connector to a dehumidifier used with the air conditioner (i.e. an air conditioner with a dehumidifying mode). The dehumidifier may be activated by energizing the wildcard connector. Both of these settings, along with other settings that may not be shown explicitly, may be changed using this or a similar user interface.

The user interfaces provided thus far may allow users to make both simple and complex changes to the way their thermostat interacts with their HVAC system. These user interfaces may provide a simplified process that enables the average homeowner to perform even difficult installation procedures. However, in some cases the installation process may become too difficult for the average homeowner. Modern HVAC systems may become very complex, and incorrect wiring may cause unexpected HVAC activity, uncomfortable environmental conditions, or even equipment damage.

In order to prevent these unpleasant outcomes, some embodiments may intelligently determine when an installation process or HVAC configuration may require a professional installer. This determination may be made while the thermostat is analyzing the mechanically-sensed wire connections. This determination may also be made while the thermostat is receiving configuration inputs from a user via the user interface. The thermostat may be configured to detect common errors, configurations that are known to cause damage, unknown configurations, or even user confusion. For example, a user making numerous changes throughout the installation process may be determined to be ill-equipped to confidently install his or her own thermostat without causing damage.

When a professional installation is considered to be desirable for a particular installation, the thermostat may provide a message on the user interface recommending a professional installer. Some embodiments may provide a reference to a website or to another resource for finding professional installers well-versed with the particular type of HVAC system and/or thermostat. A user may then heed the warning provided by the thermostat and contact the professional installer, or the user may override the warning and continue with the installation process.

Additionally, a user may be able to select professional setup. FIG. 18A illustrates a settings screen for accessing a professional setup interface. A professional setup interface may provide additional options that are not provided to a regular homeowner. These options may be segregated into the professional setup interface in order to simplify the installation process for a regular homeowner. Additionally, these options may be complex and may require special training and/or experience. In one embodiment, a warning may be presented to a user when selecting the professional setup interface. FIG. 18B illustrates a warning that may be displayed for professional setup, according to one embodiment. For example, a warning may provide a description of the dangers of proceeding with the professional setup interface without proper training. The interface may also provide an option 1802 allowing the user to continue with the professional setup interface or to go back to the regular setup interface.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A thermostat, comprising:
   a housing;
   a user interface comprising an electronic display;
   a processing system disposed within the housing and coupled to the user interface, the processing system being configured to be in operative communication with one or more temperature sensors for determining an ambient air temperature, in operative communication with one or more input devices including said user interface for determining a setpoint temperature value, and in still further operative communication with a heating, ventilation, and air conditioning (HVAC) system to control the HVAC system based at least in part on a comparison of a measured ambient temperature and the setpoint temperature value; and
   a plurality of HVAC connectors configured to receive a corresponding plurality of HVAC control wires corresponding to the HVAC system, each HVAC connector having an identifier that identifies one or more HVAC functionalities associated with that HVAC connector; and
   a connection sensing module coupled to said plurality of HVAC connectors and configured to determine the identities of a first subset of the plurality of HVAC connectors into which corresponding HVAC wires have been inserted, wherein the processing system is further configured to process said identities of said first subset of HVAC connectors to determine a configuration of the HVAC system to be controlled, wherein said processing comprises:
      identifying, based on said identities of said first subset of HVAC connectors, whether (i) only a single possible HVAC system configuration is indicated thereby, or (ii) multiple possible HVAC system configurations are indicated thereby; and
      operating, if said single possible HVAC system configuration is indicated, said HVAC system according to said single possible HVAC system configuration;
      resolving, if said multiple possible HVAC system configurations are indicated, a particular one of the multiple possible HVAC system configurations that is applicable based on at least one user response to at least one inquiry to a user presented on said user interface, and operating said HVAC system according to said resolved particular HVAC system configuration.

2. The thermostat of claim 1 wherein the electronic display of the user interface is configured to provide a graphical representation of a position of the plurality of HVAC connectors along with the functions assigned to each of the first subset of the plurality of HVAC connectors.

3. The thermostat of claim 1 wherein said resolving comprises:
   determining whether information representative of a combination of the identities of said first subset of HVAC connectors and said user response are indicative of (i) a situation in which a non-professional user can readily complete an installation process, or (ii) a situation in which a professional installer should be recommended.

4. The thermostat of claim 3 wherein said resolving further comprises providing, on the electronic display of the user interface, (i) a basic interface screen for the non-professional user, and (ii) an advanced interface for a professional installer.

5. The thermostat of claim 4 wherein the advanced interface comprises a warning indicating that damage to the HVAC system may occur.

6. The thermostat of claim 1 wherein one of the plurality of HVAC connectors comprises a wildcard connector that can be configured to interface with a plurality of different HVAC system components.

7. The thermostat of claim 1 wherein said connection sensing module is configured to determine the identities of the first subset of the plurality of HVAC connectors using mechanical sensing.

8. The thermostat of claim 1 wherein said connection sensing module is configured to determine the identities of the first subset of the plurality of HVAC connectors using electrical sensing.

9. The thermostat of claim 1 wherein the electronic display of the user interface is configured to provide a URL in cases where multiple possible HVAC system configurations are indicated by the identities of the first subset of HVAC connectors.

10. The thermostat of claim 1 wherein said multiple possible HVAC system configurations comprise a dual-fuel heat pump configuration and a single-fuel heat pump configuration, wherein said at least one inquiry to a user comprises a selection between single-fuel systems and dual-fuel systems.

11. A method of determining a heating, ventilation, and air conditioning (HVAC) system configuration for an HVAC system for control by a thermostat, the method comprising:
   determining the identities of a first subset of a plurality of HVAC connectors into which corresponding HVAC wires have been inserted, wherein the plurality of HVAC connectors are configured to receive a corresponding plurality of HVAC control wires corresponding to the HVAC system, each HVAC connector having an identifier that identifies one or more HVAC functionalities associated with that HVAC connector;
   identifying, based on said identities of said first subset of HVAC connectors, whether (i) only a single possible HVAC system configuration is indicated thereby, or (ii) multiple possible HVAC system configurations are indicated thereby;
   operating, if said single possible HVAC system configuration is indicated, said HVAC system according to said single possible HVAC system configuration; and
   resolving, if said multiple possible HVAC system configurations are indicated, a particular one of the multiple possible HVAC system configurations that is applicable based on at least one user response to at least one inquiry to a user presented on a user interface comprising an electronic display, and operating said HVAC system according to said resolved particular HVAC system configuration, wherein:
      said resolving is performed at least in part by a processing system disposed within a housing of a thermostat and coupled to the user interface, the processing system being configured to be in operative communication with one or more temperature sensors for determining an ambient air temperature, in operative communication with one or more input devices including said user interface for determining a setpoint temperature value, and in still further operative communication with the HVAC system to control the HVAC system based at least in part on a comparison of a measured ambient temperature and the setpoint temperature value.

12. The method of claim 11 wherein the electronic display of the user interface is configured to provide a graphical representation of a position of the plurality of HVAC connectors along with the functions assigned to each of the first subset of the plurality of HVAC connectors.

13. The method of claim 11 wherein said resolving comprises:
   determining whether information representative of a combination of the identities of said first subset of HVAC connectors and said user response are indicative of (i) a situation in which a non-professional user can readily complete an installation process, or (ii) a situation in which a professional installer should be recommended.

14. The method of claim 13 wherein said resolving further comprises providing, on the electronic display of the user interface, (i) a basic interface screen for the non-professional user, and (ii) an advanced interface for a professional installer.

15. The method of claim 14 wherein the advanced interface comprises a warning indicating that damage to the HVAC system may occur.

16. The method of claim 11 wherein one of the plurality of HVAC connectors comprises a wildcard connector that can be configured to interface with a plurality of different HVAC system components.

17. The method of claim 11 wherein said connection sensing module is configured to determine the identities of the first subset of the plurality of HVAC connectors using mechanical sensing.

18. The method of claim 11 wherein said multiple possible HVAC system configurations comprise a dual-fuel heat pump configuration and a single-fuel heat pump configuration, wherein will said at least one inquiry to a user comprises a selection between single-fuel systems and dual-fuel systems.

19. A thermostat comprising:
   a housing;
   a user interface;
   a processing system communicatively coupled to the user interface and disposed within the housing;
   a power stealing circuit coupled to the processing system and configured to provide power to the user interface using a rechargeable battery;
   a plurality of HVAC connectors configured to receive a corresponding plurality of HVAC control wires;
   a connection sensing module coupled to the plurality of HVAC connectors and configured to provide an indication to the processing system whether a wire is mechanically inserted for each of the plurality of HVAC connectors, wherein the processing system is configured to determine an HVAC system configuration by:
      identifying a subset of the plurality of HVAC connectors into which a wire has been mechanically inserted;
      identifying an ambiguity resulting from the subset;
      providing an indication via the user interface based on the ambiguity;
      resolving the ambiguity in accordance with an input provided to the user interface;
      determining the HVAC system configuration using the input; and
      operating the HVAC system in accordance with the HVAC system configuration.

20. The thermostat of claim 19 wherein the ambiguity comprises multiple possible HVAC system configurations that are indicated by the subset of the plurality of HVAC connectors into which a wire has been mechanically inserted.

* * * * *